(12) United States Patent
Robbins et al.

(10) Patent No.: US 10,509,241 B1
(45) Date of Patent: Dec. 17, 2019

(54) OPTICAL DISPLAYS

(71) Applicants: Rockwell Collins, Inc., Cedar Rapids, IA (US); Digilens Inc., Sunnyvale, CA (US)

(72) Inventors: Steven J. Robbins, San Jose, CA (US); James H. Stanley, Palo Alto, CA (US); Francois Raynal, San Jose, CA (US); Robert D. Brown, Lake Oswego, OR (US); James M. Tedesco, Livonia, MI (US); Wyatt L. Hendrick, San Diego, CA (US); Milan M. Popovich, Leicester (GB); Jonathan D. Waldern, Los Altos Hills, CA (US); Alastair J. Grant, San Jose, CA (US)

(73) Assignees: ROCKWELL COLLINS, INC., Cedar Rapids, IA (US); DIGILENS INC., Sunnyvale, CA (US)

( * ) Notice: Subject to any disclaimer, the term of this patent is extended or adjusted under 35 U.S.C. 154(b) by 349 days.

(21) Appl. No.: 14/465,763

(22) Filed: Aug. 21, 2014

Related U.S. Application Data

(63) Continuation of application No. 13/355,360, filed on Jan. 20, 2012, now Pat. No. 8,817,350, which is a
(Continued)

(51) Int. Cl.
*G02B 5/32* (2006.01)
*G02B 5/18* (2006.01)
(Continued)

(52) U.S. Cl.
CPC ............. *G02F 1/01* (2013.01); *G02B 5/18* (2013.01); *G02B 5/32* (2013.01); *G02B 27/0103* (2013.01);
(Continued)

(58) Field of Classification Search
CPC ........ G02B 5/18; G02B 5/32; G02B 27/0103; G02B 27/0149
(Continued)

(56) References Cited

U.S. PATENT DOCUMENTS 2,141,884 A    12/1938   Sonnefeld
3,620,601 A    11/1971   Waghorn
(Continued)

FOREIGN PATENT DOCUMENTS

CN    200944140 Y    9/2007
CN    101151562 A    3/2008
(Continued)

OTHER PUBLICATIONS

Final Office Action on U.S. Appl. No. 13/869,866 dated Oct. 3, 2014, 17 pages.
(Continued)

*Primary Examiner* — Jack Dinh
(74) *Attorney, Agent, or Firm* — Donna P. Suchy; Daniel M. Barbieri

(57) ABSTRACT

An apparatus for providing an optical display includes an optical substrate for propagating light received from a light source, a first set of one or more switchable diffractive elements in the substrate, and a second set of one or more switchable diffractive elements in the substrate. Each diffractive element in the second set corresponds to a diffractive element in the first set. Each of the diffractive elements in the first and second sets is configured to switch between on and off states. One of the states is for diffracting light and the other state for allowing light to pass through. Each of the first set of diffractive elements is configured to diffract the light at an angle for propagation in the substrate. Each of the second set of diffractive elements is configured to diffract the light for display.

18 Claims, 8 Drawing Sheets

Related U.S. Application Data continuation of application No. 12/571,262, filed on Sep. 30, 2009, now Pat. No. 8,233,204.

(51) Int. Cl.
- *G09G 5/00* (2006.01)
- *G02F 1/01* (2006.01)
- *G02B 27/01* (2006.01)

(52) U.S. Cl.
CPC .. *G02B 27/0149* (2013.01); *G02B 2027/0152* (2013.01)

(58) Field of Classification Search
USPC .......... 359/566, 568, 15, 900, 1; 385/31, 37; 345/7
See application file for complete search history.

(56) References Cited

U.S. PATENT DOCUMENTS

| | | |
|---|---|---|
| 3,851,303 A | 11/1974 | Muller |
| 3,885,095 A | 5/1975 | Wolfson et al. |
| 3,940,204 A | 2/1976 | Withrington |
| 4,082,432 A | 4/1978 | Kirschner |
| 4,099,841 A | 7/1978 | Ellis |
| 4,178,074 A | 12/1979 | Heller |
| 4,218,111 A | 8/1980 | Withrington et al. |
| 4,232,943 A | 11/1980 | Rogers |
| 4,309,070 A | 1/1982 | St. Leger Searle |
| 4,647,967 A | 3/1987 | Kirschner et al. |
| 4,711,512 A | 12/1987 | Upatnieks |
| 4,714,320 A | 12/1987 | Banbury |
| 4,743,083 A | 5/1988 | Schimpe |
| 4,749,256 A | 6/1988 | Bell et al. |
| 4,775,218 A | 10/1988 | Wood et al. |
| 4,799,765 A | 1/1989 | Ferrer |
| 4,854,688 A | 8/1989 | Hayford et al. |
| 4,928,301 A | 5/1990 | Smoot |
| 4,946,245 A | 8/1990 | Chamberlin et al. |
| 5,007,711 A | 4/1991 | Wood et al. |
| 5,035,734 A | 7/1991 | Honkanen et al. |
| 5,076,664 A | 12/1991 | Migozzi |
| 5,079,416 A | 1/1992 | Filipovich |
| 5,117,285 A | 5/1992 | Nelson et al. |
| 5,124,821 A | 6/1992 | Antier et al. |
| 5,148,302 A | 9/1992 | Nagano et al. |
| 5,151,958 A | 9/1992 | Honkanen |
| 5,153,751 A | 10/1992 | Ishikawa et al. |
| 5,159,445 A | 10/1992 | Gitlin et al. |
| 5,160,523 A | 11/1992 | Honkanen et al. |
| 5,183,545 A | 2/1993 | Branca et al. |
| 5,187,597 A | 2/1993 | Kato et al. |
| 5,210,624 A | 5/1993 | Matsumoto et al. |
| 5,218,360 A | 6/1993 | Goetz et al. |
| 5,243,413 A | 9/1993 | Gitlin et al. |
| 5,289,315 A | 2/1994 | Makita et al. |
| 5,295,208 A | 3/1994 | Caulfield et al. |
| 5,303,085 A | 4/1994 | Rallison |
| 5,317,405 A | 5/1994 | Kuriki et al. |
| 5,341,230 A | 8/1994 | Smith |
| 5,351,151 A | 9/1994 | Levy |
| 5,359,362 A | 10/1994 | Lewis et al. |
| 5,363,220 A | 11/1994 | Kuwayama et al. |
| 5,369,511 A | 11/1994 | Amos |
| 5,400,069 A | 3/1995 | Braun et al. |
| 5,408,346 A | 4/1995 | Trissel et al. |
| 5,418,584 A | 5/1995 | Larson |
| 5,438,357 A | 8/1995 | McNelley |
| 5,455,693 A | 10/1995 | Wreede et al. |
| 5,471,326 A | 11/1995 | Hall et al. |
| 5,473,222 A | 12/1995 | Thoeny et al. |
| 5,496,621 A | 3/1996 | Makita et al. |
| 5,500,671 A | 3/1996 | Andersson et al. |
| 5,510,913 A | 4/1996 | Hashimoto et al. |
| 5,515,184 A | 5/1996 | Caulfield et al. |
| 5,524,272 A | 6/1996 | Podowski et al. |
| 5,532,736 A | 7/1996 | Kuriki et al. |
| 5,537,232 A | 7/1996 | Biles |
| 5,572,248 A | 11/1996 | Allen et al. |
| 5,579,026 A | 11/1996 | Tabata |
| 5,583,795 A | 12/1996 | Smyth |
| 5,604,611 A | 2/1997 | Saburi et al. |
| 5,606,433 A | 2/1997 | Yin et al. |
| 5,612,733 A | 3/1997 | Flohr |
| 5,612,734 A | 3/1997 | Nelson et al. |
| 5,619,254 A | 4/1997 | McNelley |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,907 A | 9/1997 | Veligdan |
| 5,682,255 A | 10/1997 | Friesem et al. |
| 5,694,230 A | 12/1997 | Welch |
| 5,701,132 A | 12/1997 | Kollin et al. |
| 5,706,108 A | 1/1998 | Ando et al. |
| 5,707,925 A | 1/1998 | Akada et al. |
| 5,724,189 A | 3/1998 | Ferrante |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,742,262 A | 4/1998 | Tabata et al. |
| 5,751,452 A | 5/1998 | Tanaka et al. |
| 5,760,931 A | 6/1998 | Saburi et al. |
| 5,764,414 A | 6/1998 | King et al. |
| 5,790,288 A | 8/1998 | Jager et al. |
| 5,812,608 A | 9/1998 | Valimaki et al. |
| 5,822,127 A | 10/1998 | Chen et al. |
| 5,841,507 A | 11/1998 | Barnes |
| 5,856,842 A | 1/1999 | Tedesco |
| 5,868,951 A | 2/1999 | Schuck et al. |
| 5,886,822 A | 3/1999 | Spitzer |
| 5,892,598 A | 4/1999 | Asakawa et al. |
| 5,898,511 A | 4/1999 | Mizutani et al. |
| 5,903,395 A | 5/1999 | Rallison et al. |
| 5,907,416 A | 5/1999 | Hegg et al. |
| 5,907,436 A | 5/1999 | Perry et al. |
| 5,917,459 A | 6/1999 | Son et al. |
| 5,926,147 A | 7/1999 | Sehm et al. |
| 5,929,946 A | 7/1999 | Sharp et al. |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,966,223 A | 10/1999 | Friesem et al. |
| 5,985,422 A | 11/1999 | Krauter |
| 5,991,087 A | 11/1999 | Rallison |
| 5,999,314 A | 12/1999 | Asakura et al. |
| 6,042,947 A | 3/2000 | Asakura et al. |
| 6,043,585 A | 3/2000 | Plessky et al. |
| 6,075,626 A | 6/2000 | Mizutani et al. |
| 6,078,427 A | 6/2000 | Fontaine et al. |
| 6,115,152 A | 9/2000 | Popovich et al. |
| 6,127,066 A | 10/2000 | Ueda et al. |
| 6,137,630 A | 10/2000 | Tsou et al. |
| 6,169,613 B1 | 1/2001 | Amitai et al. |
| 6,176,837 B1 | 1/2001 | Foxlin |
| 6,195,206 B1 | 2/2001 | Yona et al. |
| 6,222,675 B1 | 4/2001 | Mall et al. |
| 6,222,971 B1 | 4/2001 | Veligdan et al. |
| 6,249,386 B1 | 6/2001 | Yona et al. |
| 6,259,423 B1 | 7/2001 | Tokito et al. |
| 6,259,559 B1 | 7/2001 | Kobayashi et al. |
| 6,285,813 B1 | 9/2001 | Schultz et al. |
| 6,317,083 B1 | 11/2001 | Johnson et al. |
| 6,317,227 B1 | 11/2001 | Mizutani et al. |
| 6,321,069 B1 | 11/2001 | Piirainen |
| 6,327,089 B1 | 12/2001 | Hosaki et al. |
| 6,333,819 B1 | 12/2001 | Svedenkrans |

(56) References Cited

U.S. PATENT DOCUMENTS

| | | |
|---|---|---|
| 6,340,540 B1 | 1/2002 | Ueda et al. |
| 6,351,333 B2 | 2/2002 | Araki et al. |
| 6,356,172 B1 | 3/2002 | Koivisto et al. |
| 6,359,730 B2 | 3/2002 | Tervonen |
| 6,359,737 B1 | 3/2002 | Stringfellow |
| 6,366,378 B1 | 4/2002 | Tervonen et al. |
| 6,392,812 B1 | 5/2002 | Howard |
| 6,409,687 B1 | 6/2002 | Foxlin |
| 6,470,132 B1 | 10/2002 | Nousiainen et al. |
| 6,486,997 B1 | 11/2002 | Bruzzone et al. |
| 6,504,518 B1 | 1/2003 | Kuwayama et al. |
| 6,524,771 B2 | 2/2003 | Maeda et al. |
| 6,545,778 B2 | 4/2003 | Ono et al. |
| 6,550,949 B1 | 4/2003 | Bauer et al. |
| 6,557,413 B2 | 5/2003 | Nieminen et al. |
| 6,563,648 B2 | 5/2003 | Gleckman et al. |
| 6,580,529 B1 | 6/2003 | Amitai et al. |
| 6,583,873 B1 | 6/2003 | Goncharov et al. |
| 6,587,619 B1 | 7/2003 | Kinoshita |
| 6,598,987 B1 | 7/2003 | Parikka |
| 6,608,720 B1 | 8/2003 | Freeman |
| 6,611,253 B1 | 8/2003 | Cohen |
| 6,646,810 B2 | 11/2003 | Harter et al. |
| 6,661,578 B2 | 12/2003 | Hedrick |
| 6,674,578 B2 | 1/2004 | Sugiyama et al. |
| 6,686,815 B1 | 2/2004 | Mirshekarl-Syahkal et al. |
| 6,690,516 B2 | 2/2004 | Aritake et al. |
| 6,721,096 B2 | 4/2004 | Bruzzone et al. |
| 6,741,189 B1 | 5/2004 | Gibbons, II et al. |
| 6,744,478 B1 | 6/2004 | Asakura et al. |
| 6,748,342 B1 | 6/2004 | Dickhaus |
| 6,750,941 B2 | 6/2004 | Satoh et al. |
| 6,750,995 B2 | 6/2004 | Dickson |
| 6,757,105 B2 | 6/2004 | Niv et al. |
| 6,771,403 B1 | 8/2004 | Endo et al. |
| 6,776,339 B2 | 8/2004 | Piikivi |
| 6,781,701 B1 | 8/2004 | Sweetser et al. |
| 6,805,490 B2 | 10/2004 | Levola |
| 6,825,987 B2 | 11/2004 | Repetto et al. |
| 6,829,095 B2 | 12/2004 | Amitai |
| 6,833,955 B2 | 12/2004 | Niv |
| 6,836,369 B2 | 12/2004 | Fujikawa et al. |
| 6,844,212 B2 | 1/2005 | Bond et al. |
| 6,844,980 B2 | 1/2005 | He et al. |
| 6,847,274 B2 | 1/2005 | Salmela et al. |
| 6,847,488 B2 | 1/2005 | Travis |
| 6,853,491 B1 | 2/2005 | Ruhle et al. |
| 6,864,861 B2 | 3/2005 | Schehrer et al. |
| 6,864,927 B1 | 3/2005 | Cathey |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,922,267 B2 | 7/2005 | Endo et al. |
| 6,926,429 B2 | 8/2005 | Barlow et al. |
| 6,940,361 B1 | 9/2005 | Jokio et al. |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,958,662 B1 | 10/2005 | Salmela et al. |
| 6,987,908 B2 | 1/2006 | Bond et al. |
| 7,003,187 B2 | 2/2006 | Frick et al. |
| 7,018,744 B2 | 3/2006 | Otaki et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,053,735 B2 | 5/2006 | Salmela et al. |
| 7,058,434 B2 | 6/2006 | Wang et al. |
| 7,095,562 B1 | 8/2006 | Peng et al. |
| 7,101,048 B2 | 9/2006 | Travis |
| 7,110,184 B1 | 9/2006 | Yona et al. |
| 7,123,418 B2 | 10/2006 | Weber et al. |
| 7,126,418 B2 | 10/2006 | Hunton et al. |
| 7,126,583 B1 | 10/2006 | Breed |
| 7,132,200 B1 | 11/2006 | Ueda et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,181,105 B2 | 2/2007 | Teramura et al. |
| 7,181,108 B2 | 2/2007 | Levola |
| 7,184,615 B2 | 2/2007 | Levola |
| 7,190,849 B2 | 3/2007 | Katase |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,230,767 B2 | 6/2007 | Walck et al. |
| 7,242,527 B2 | 7/2007 | Spitzer et al. |
| 7,248,128 B2 | 7/2007 | Mattila et al. |
| 7,259,906 B1 | 8/2007 | Islam |
| 7,268,946 B2 | 9/2007 | Wang |
| 7,285,903 B2 | 10/2007 | Cull et al. |
| 7,286,272 B2 | 10/2007 | Mukawa |
| 7,289,069 B2 | 10/2007 | Ranta |
| 7,299,983 B2 | 11/2007 | Piikivi |
| 7,313,291 B2 | 12/2007 | Okhotnikov et al. |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,375,870 B2 | 5/2008 | Schorpp |
| 7,391,573 B2 | 6/2008 | Amitai |
| 7,394,865 B2 | 7/2008 | Borran et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,415,173 B2 | 8/2008 | Kassamakov et al. |
| 7,418,170 B2 | 8/2008 | Mukawa et al. |
| 7,433,116 B1 | 10/2008 | Islam |
| 7,436,568 B1 | 10/2008 | Kuykendall, Jr. |
| 7,454,103 B2 | 11/2008 | Parriaux |
| 7,457,040 B2 | 11/2008 | Amitai |
| 7,466,994 B2 | 12/2008 | Pihlaja et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,500,104 B2 | 3/2009 | Goland |
| 7,528,385 B2 | 5/2009 | Volodin et al. |
| 7,545,429 B2 | 6/2009 | Travis |
| 7,550,234 B2 | 6/2009 | Otaki et al. |
| 7,567,372 B2 | 7/2009 | Schorpp |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,588,863 B2 | 9/2009 | Takizawa et al. |
| 7,589,900 B1 | 9/2009 | Powell |
| 7,589,901 B2 | 9/2009 | Dejong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,616,270 B2 | 11/2009 | Hirabayashi et al. |
| 7,618,750 B2 | 11/2009 | Ueda et al. |
| 7,629,086 B2 | 12/2009 | Otaki et al. |
| 7,639,911 B2 | 12/2009 | Lee et al. |
| 7,643,214 B2 | 1/2010 | Amitai |
| 7,656,585 B1 | 2/2010 | Powell et al. |
| 7,660,047 B1 | 2/2010 | Travis et al. |
| 7,672,055 B2 | 3/2010 | Amitai |

(56) References Cited

U.S. PATENT DOCUMENTS

| | | | |
|---|---|---|---|
| 7,710,654 B2 | 5/2010 | Ashkenazi et al. |
| 7,724,441 B2 | 5/2010 | Amitai |
| 7,724,442 B2 | 5/2010 | Amitai |
| 7,724,443 B2 | 5/2010 | Amitai |
| 7,733,572 B1 | 6/2010 | Brown et al. |
| 7,747,113 B2 | 6/2010 | Mukawa et al. |
| 7,751,122 B2 | 7/2010 | Amitai |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,872,804 B2 | 1/2011 | Moon et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,944,428 B2 | 5/2011 | Travis |
| 7,969,644 B2 | 6/2011 | Tilleman et al. |
| 7,970,246 B2 | 6/2011 | Travis et al. |
| 7,976,208 B2 | 7/2011 | Travis |
| 7,999,982 B2 | 8/2011 | Endo et al. |
| 8,000,491 B2 | 8/2011 | Brodkin et al. |
| 8,004,765 B2 | 8/2011 | Amitai |
| 8,016,475 B2 | 9/2011 | Travis |
| 8,022,942 B2 | 9/2011 | Bathiche et al. |
| RE42,992 E | 12/2011 | David |
| 8,079,713 B2 | 12/2011 | Ashkenazi |
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,107,023 B2 | 1/2012 | Simmonds et al. |
| 8,107,780 B2 | 1/2012 | Simmonds |
| 8,132,948 B2 | 3/2012 | Owen et al. |
| 8,132,976 B2 | 3/2012 | Odell et al. |
| 8,136,690 B2 | 3/2012 | Fang et al. |
| 8,137,981 B2 | 3/2012 | Andrew et al. |
| 8,149,086 B2 | 4/2012 | Klein et al. |
| 8,152,315 B2 | 4/2012 | Travis et al. |
| 8,155,489 B2 | 4/2012 | Saarikko et al. |
| 8,159,752 B2 | 4/2012 | Wertheim et al. |
| 8,160,409 B2 | 4/2012 | Large |
| 8,160,411 B2 | 4/2012 | Levola et al. |
| 8,186,874 B2 | 5/2012 | Sinbar et al. |
| 8,188,925 B2 | 5/2012 | Dejean |
| 8,189,263 B1 | 5/2012 | Wang et al. |
| 8,189,973 B2 | 5/2012 | Travis et al. |
| 8,199,803 B2 | 6/2012 | Hauske et al. |
| 8,213,065 B2 | 7/2012 | Mukawa |
| 8,233,204 B1 | 7/2012 | Robbins et al. |
| 8,253,914 B2 | 8/2012 | Kajiya et al. |
| 8,254,031 B2 | 8/2012 | Levola |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,314,819 B2 | 11/2012 | Kimmel et al. |
| 8,321,810 B2 | 11/2012 | Heintze |
| 8,335,040 B2 | 12/2012 | Mukawa et al. |
| 8,351,744 B2 | 1/2013 | Travis et al. |
| 8,354,806 B2 | 1/2013 | Travis et al. |
| 8,355,610 B2 | 1/2013 | Simmonds |
| 8,369,019 B2 | 2/2013 | Baker et al. |
| 8,384,694 B2 | 2/2013 | Powell et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |
| 8,432,372 B2 | 4/2013 | Butler et al. |
| 8,472,119 B1 | 6/2013 | Kelly |
| 8,472,120 B2 | 6/2013 | Border et al. |
| 8,477,261 B2 | 7/2013 | Travis et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,662 B2 | 7/2013 | Noui |
| 8,508,848 B2 | 8/2013 | Saarikko |
| 8,547,638 B2 | 10/2013 | Levola |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| 8,633,786 B2 | 1/2014 | Ermolov et al. |
| 8,634,139 B1 | 1/2014 | Brown et al. |
| 8,639,072 B2 | 1/2014 | Popovich et al. |
| 8,643,691 B2 | 2/2014 | Rosenfeld et al. |
| 8,649,099 B2 | 2/2014 | Schultz et al. |
| 8,654,420 B2 | 2/2014 | Simmonds |
| 8,659,826 B1 | 2/2014 | Brown et al. |
| 8,670,029 B2 | 3/2014 | McEldowney |
| 8,693,087 B2 | 4/2014 | Nowatzyk et al. |
| 8,736,802 B2 | 5/2014 | Kajiya et al. |
| 8,736,963 B2 | 5/2014 | Robbins et al. |
| 8,749,886 B2 | 6/2014 | Gupta |
| 8,749,890 B1 | 6/2014 | Wood et al. |
| 8,767,294 B2 | 7/2014 | Chen et al. |
| 8,810,600 B2 | 8/2014 | Bohn et al. |
| 8,814,691 B2 | 8/2014 | Haddick et al. |
| 8,830,584 B2 | 9/2014 | Saarikko et al. |
| 8,903,207 B1 | 12/2014 | Brown et al. |
| 8,913,324 B2 | 12/2014 | Schrader |
| 8,937,772 B1 | 1/2015 | Burns et al. |
| 8,938,141 B2 | 1/2015 | Magnusson |
| 8,964,298 B2 | 2/2015 | Haddick et al. |
| 9,244,280 B1 | 1/2016 | Tiana et al. |
| 9,341,846 B2 | 5/2016 | Popovich et al. |
| 9,366,864 B1 | 6/2016 | Brown et al. |
| 9,456,744 B2 | 10/2016 | Popovich et al. |
| 9,523,852 B1 | 12/2016 | Brown et al. |
| 9,632,226 B2 | 4/2017 | Waldern et al. |
| 9,933,684 B2 | 4/2018 | Brown et al. |
| 2002/0021461 A1 | 2/2002 | Ono et al. |
| 2002/0127497 A1 | 9/2002 | Brown et al. |
| 2002/0131175 A1 | 9/2002 | Yagi et al. |
| 2003/0030912 A1 | 2/2003 | Gleckman et al. |
| 2003/0039442 A1 | 2/2003 | Bond et al. |
| 2003/0063042 A1 | 4/2003 | Friesem et al. |
| 2003/0149346 A1 | 8/2003 | Arnone et al. |
| 2003/0228019 A1 | 12/2003 | Eichler et al. |
| 2004/0089842 A1 | 5/2004 | Sutherland et al. |
| 2004/0130797 A1 | 7/2004 | Leigh Travis |
| 2004/0188617 A1 | 9/2004 | Devitt et al. |
| 2004/0208446 A1 | 10/2004 | Bond et al. |
| 2004/0208466 A1 | 10/2004 | Mossberg et al. |
| 2005/0135747 A1 | 6/2005 | Greiner et al. |
| 2005/0136260 A1 | 6/2005 | Garcia |
| 2005/0259302 A9 | 11/2005 | Metz et al. |
| 2005/0269481 A1 | 12/2005 | David et al. |
| 2006/0093793 A1 | 5/2006 | Miyakawa et al. |
| 2006/0114564 A1 | 6/2006 | Sutherland et al. |
| 2006/0119916 A1 | 6/2006 | Sutherland et al. |
| 2006/0132914 A1 | 6/2006 | Weiss et al. |
| 2006/0221448 A1 | 10/2006 | Nivon et al. |
| 2006/0228073 A1 | 10/2006 | Mukawa et al. |
| 2006/0279662 A1 | 12/2006 | Kapellner et al. |
| 2006/0291021 A1 | 12/2006 | Mukawa |
| 2007/0019152 A1 | 1/2007 | Caputo et al. |
| 2007/0019297 A1 | 1/2007 | Stewart et al. |
| 2007/0041684 A1 | 2/2007 | Popovich et al. |
| 2007/0045596 A1 | 3/2007 | King et al. |
| 2007/0052929 A1 | 3/2007 | Allman et al. |
| 2007/0089625 A1 | 4/2007 | Grinberg et al. |
| 2007/0133920 A1 | 6/2007 | Lee et al. |
| 2007/0133983 A1 | 6/2007 | Traff |
| 2007/0188837 A1 | 8/2007 | Shimizu et al. |
| 2007/0211164 A1 | 9/2007 | Olsen et al. |
| 2008/0043334 A1 | 2/2008 | Itzkovitch et al. |
| 2008/0106775 A1 | 5/2008 | Amitai et al. |

(56) References Cited

U.S. PATENT DOCUMENTS

| | | |
|---|---|---|
| 2008/0136923 A1 | 6/2008 | Inbar et al. |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2008/0309586 A1 | 12/2008 | Vitale |
| 2009/0010135 A1 | 1/2009 | Ushiro et al. |
| 2009/0017424 A1 | 1/2009 | Yoeli et al. |
| 2009/0019222 A1 | 1/2009 | Verma et al. |
| 2009/0052046 A1 | 2/2009 | Amitai |
| 2009/0052047 A1 | 2/2009 | Amitai |
| 2009/0067774 A1 | 3/2009 | Magnusson |
| 2009/0097122 A1 | 4/2009 | Niv |
| 2009/0097127 A1 | 4/2009 | Amitai |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128902 A1 | 5/2009 | Niv et al. |
| 2009/0128911 A1 | 5/2009 | Itzkovitch et al. |
| 2009/0153437 A1 | 6/2009 | Aharoni |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0303599 A1 | 12/2009 | Levola |
| 2009/0316246 A1 | 12/2009 | Asai et al. |
| 2010/0039796 A1 | 2/2010 | Mukawa |
| 2010/0060551 A1 | 3/2010 | Sugiyama et al. |
| 2010/0060990 A1 | 3/2010 | Wertheim et al. |
| 2010/0079865 A1 | 4/2010 | Saarikko et al. |
| 2010/0092124 A1 | 4/2010 | Magnusson et al. |
| 2010/0096562 A1 | 4/2010 | Klunder et al. |
| 2010/0103078 A1 | 4/2010 | Mukawa et al. |
| 2010/0136319 A1 | 6/2010 | Imai et al. |
| 2010/0141555 A1 | 6/2010 | Rorberg et al. |
| 2010/0165465 A1 | 7/2010 | Levola |
| 2010/0171680 A1 | 7/2010 | Lapidot et al. |
| 2010/0177388 A1 | 7/2010 | Cohen et al. |
| 2010/0214659 A1 | 8/2010 | Levola |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0246003 A1 | 9/2010 | Simmonds et al. |
| 2010/0246004 A1 | 9/2010 | Simmonds |
| 2010/0246993 A1 | 9/2010 | Rieger et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0284180 A1 | 11/2010 | Popovich et al. |
| 2010/0296163 A1 | 11/2010 | Saarikko |
| 2010/0315719 A1 | 12/2010 | Saarikko |
| 2010/0321781 A1 | 12/2010 | Levola et al. |
| 2011/0002143 A1 | 1/2011 | Saarikko et al. |
| 2011/0013423 A1 | 1/2011 | Selbrede et al. |
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0038024 A1 | 2/2011 | Wang et al. |
| 2011/0050548 A1 | 3/2011 | Blumenfeld et al. |
| 2011/0096401 A1 | 4/2011 | Levola |
| 2011/0157707 A1 | 6/2011 | Tilleman et al. |
| 2011/0164221 A1 | 7/2011 | Tilleman et al. |
| 2011/0211239 A1 | 9/2011 | Mukawa et al. |
| 2011/0232211 A1 | 9/2011 | Farahi |
| 2011/0235179 A1 | 9/2011 | Simmonds |
| 2011/0235365 A1 | 9/2011 | McCollum et al. |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2011/0299075 A1 | 12/2011 | Meade et al. |
| 2011/0310356 A1 | 12/2011 | Vallius |
| 2012/0007979 A1 | 1/2012 | Schneider et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0099203 A1 | 4/2012 | Boubis et al. |
| 2012/0105634 A1 | 5/2012 | Meidan et al. |
| 2012/0120493 A1 | 5/2012 | Simmonds et al. |
| 2012/0127577 A1 | 5/2012 | Desserouer |
| 2012/0224062 A1 | 9/2012 | Lacoste et al. |
| 2012/0235884 A1 | 9/2012 | Miller et al. |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0294037 A1 | 11/2012 | Holman et al. |
| 2012/0300311 A1 | 11/2012 | Simmonds et al. |
| 2012/0320460 A1 | 12/2012 | Levola |
| 2013/0069850 A1 | 3/2013 | Mukawa et al. |
| 2013/0101253 A1 | 4/2013 | Popovich et al. |
| 2013/0138275 A1 | 5/2013 | Nauman et al. |
| 2013/0141937 A1 | 6/2013 | Katsuta et al. |
| 2013/0170031 A1 | 7/2013 | Bohn et al. |
| 2013/0200710 A1 | 8/2013 | Robbins |
| 2013/0249895 A1 | 9/2013 | Westerinen et al. |
| 2013/0250207 A1 | 9/2013 | Bohn |
| 2013/0257848 A1 | 10/2013 | Westerinen et al. |
| 2013/0258701 A1 | 10/2013 | Westerinen et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2014/0104665 A1 | 4/2014 | Popovich et al. |
| 2014/0104685 A1 | 4/2014 | Bohn et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0152778 A1 | 6/2014 | Ihlenburg et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0172296 A1 | 6/2014 | Shtukater |
| 2014/0176528 A1 | 6/2014 | Robbins |
| 2014/0204455 A1 | 7/2014 | Popovich et al. |
| 2014/0211322 A1 | 7/2014 | Bohn et al. |
| 2014/0218801 A1 | 8/2014 | Simmonds et al. |
| 2014/0300966 A1 | 10/2014 | Travers et al. |
| 2015/0010265 A1 | 1/2015 | Popovich et al. |
| 2015/0167868 A1 | 6/2015 | Boncha |
| 2015/0177688 A1 | 6/2015 | Popovich et al. |
| 2015/0277375 A1 | 10/2015 | Large et al. |
| 2015/0289762 A1 | 10/2015 | Popovich et al. |
| 2015/0316768 A1 | 11/2015 | Simmonds |
| 2016/0178901 A1 | 6/2016 | Ishikawa |
| 2016/0209657 A1 | 7/2016 | Popovich et al. |
| 2016/0238772 A1 | 8/2016 | Waldern et al. |
| 2016/0274356 A1 | 9/2016 | Mason |
| 2016/0291328 A1 | 10/2016 | Popovich et al. |
| 2017/0031160 A1 | 2/2017 | Popovich et al. |
| 2018/0052277 A1 | 2/2018 | Schowengerdt et al. |
| 2018/0373115 A1 | 12/2018 | Brown et al. |

FOREIGN PATENT DOCUMENTS

| | | |
|---|---|---|
| CN | 101263412 A | 9/2008 |
| CN | 101589326 | 11/2009 |
| CN | 101688977 A | 3/2010 |
| CN | 101726857 A | 6/2010 |
| CN | 101881936 A | 11/2010 |
| CN | 101910900 A | 12/2010 |
| CN | 102608762 A | 7/2012 |
| CN | 104520751 A | 4/2015 |
| DE | 102006003785 | 7/2007 |
| EP | 0 822 441 | 2/1998 |
| EP | 2 110 701 | 10/2009 |
| EP | 2 196 729 | 6/2010 |
| EP | 2 225 592 | 9/2010 |
| EP | 2 381 290 | 10/2011 |
| EP | 2 733 517 | 5/2014 |
| FR | 2677463 | 12/1992 |
| GB | 2 115 178 A | 9/1983 |
| JP | 2002-529790 A | 9/2002 |
| JP | 2004-157245 | 6/2004 |

(56) References Cited

FOREIGN PATENT DOCUMENTS

| | | |
|---|---|---|
| JP | 2006-350129 A | 12/2006 |
| JP | 2007-011057 A | 1/2007 |
| JP | 2007-219106 A | 8/2007 |
| JP | 2009-133999 A | 6/2009 |
| JP | 2016-030503 | 3/2016 |
| WO | WO-99/52002 | 10/1999 |
| WO | WO-00/28369 A2 | 5/2000 |
| WO | WO-03/081320 A1 | 10/2003 |
| WO | WO-2006/002870 | 1/2006 |
| WO | WO-2007/130130 A2 | 11/2007 |
| WO | WO-2009/013597 A2 | 1/2009 |
| WO | WO-2009/077802 | 6/2009 |
| WO | WO-2010/067114 | 6/2010 |
| WO | WO-2010/067117 | 6/2010 |
| WO | WO-2010/125337 A2 | 11/2010 |
| WO | WO-2011/012825 | 2/2011 |
| WO | WO-2011/051660 A1 | 5/2011 |
| WO | WO-2011/055109 A2 | 5/2011 |
| WO | WO-2011/107831 | 9/2011 |
| WO | WO-2013/027006 A1 | 2/2013 |
| WO | WO-2013/033274 A1 | 3/2013 |
| WO | WO-2013/163347 | 10/2013 |
| WO | WO-2014/091200 | 6/2014 |
| WO | WO-2016/044193 | 3/2016 |

OTHER PUBLICATIONS

Final Office Action on U.S. Appl. No. 14/038,400 dated Aug. 10, 2015, 32 pages.
First office action received in Chinese patent application No. 201380001530.1, dated Jun. 30, 2015, 9 pages with English translation.
Non-Final Office Action on U.S. Appl. No. 13/869,866 dated Jul. 22, 2015, 28 pages.
Non-Final Office Action on U.S. Appl. No. 13/892,026 dated Aug. 6, 2015, 22 pages.
Non-Final Office Action on U.S. Appl. No. 13/892,057 dated Jul. 30, 2015, 29 pages.
Non-Final Office Action on U.S. Appl. No. 14/109,551 dated Jul. 14, 2015, 32 pages.
Non-Final Office Action on U.S. Appl. No. 14/168,173 dated Jun. 22, 2015, 14 pages.
Notice of Allowance on U.S. Appl. No. 13/355,360 dated Apr. 10, 2014, 7 pages.
Office Action, USPTO, U.S. Appl. No. 10/696,507, dated Nov. 13, 2008, 15 pages.
Restriction Requirement for U.S. Appl. No. 12/700,557, dated Oct. 17, 2012, 5 pages.
U.S. Appl. No. 61/344,748, filed Sep. 28, 2010, Unknown.
U.S. Appl. No. 61/457,835, filed Jun. 16, 2011, Unknown.
U.S. Appl. No. 61/573,066, filed Aug. 24, 2012, Unknown.
U.S. Appl. No. 61/573,082, filed Aug. 29, 2011, Unknown.
U.S. Appl. No. 61/573,121, filed Sep. 7, 2011, Unknown.
U.S. Appl. No. 61/573,156, filed Sep. 16, 2011, Unknown.
U.S. Appl. No. 61/573,175, filed Sep. 19, 2011, Unknown.
U.S. Appl. No. 61/573,176, filed Sep. 19, 2011, Unknown.
U.S. Appl. No. 61/573,196, filed Sep. 25, 2011, Unknown.
U.S. Appl. No. 61/627,202, filed Oct. 7, 2011, Unknown.
U.S. Appl. No. 61/687,436, filed Apr. 25, 2012, Waldern et al.
U.S. Appl. No. 61/689,907, filed Apr. 25, 2012, Waldern et al.
U.S. Appl. No. 61/796,795, filed Nov. 20, 2012, Unknown.
U.S. Appl. No. 61/850,856, filed Feb. 25, 2013, Unknown.
Ayras, et al., "Exit pupil expander with a large field of view based on diffractive optics", Journal of the Society for Information Display, 17/8, 2009, pp. 659-664.
Cameron, A., The Application of Holograhpic Optical Waveguide Technology to Q-Sight Family of Helmet Mounted Displays, Proc. of SPIE, vol. 7326, 73260H-1, 2009, 11 pages.
Caputo, R. et al., Policryps Switchable Holographic Grating: A Promising Grating Electro-Optical Pixel for High Resolution Display Application; Journal of Display Technology, vol. 2, No. 1, Mar. 2006, pp. 38-51, 14 pages.

Extended European Search Report for EP Application No. 13192383, dated Apr. 2, 2014, 7 pages.
International Preliminary Report on Patentability for PCT Application No. PCT/US2013/038070, dated Oct. 28, 2014, 6 pages.
International Search Report and Written Opinion regarding PCT/US2013/038070, dated Aug. 14, 2013, 14 pages.
Levola, et al., "Replicated slanted gratings with a high refractive index material for in and outcoupling of light" Optics Express, vol. 15, Issue 5, pp. 2067-2074 (2007).
Moffitt, "Head-Mounted Display Image Configurations", retrieved from the internet at http://www.kirkmoffitt.com/hmd_image_configurations.pdf on Dec. 19, 2014, dated May 2008, 25 pages.
Non-Final Office Action on U.S. Appl. No. 13/869,866 dated May 28, 2014, 16 pages.
Nordin, G., et al., Journal of the Optical Society of America A., vol. 9, No. 12, Dec. 1992, pp. 2206-2217, 12 pages.
Office Action for U.S. Appl. No. 13/250,621, dated May 21, 2013, 10 pages.
Office Action for U.S. Appl. No. 13/250,940, dated Aug. 28, 2013, 15 pages.
Office Action for U.S. Appl. No. 13/250,940, dated Mar. 12, 2013, 11 pages.
Office Action for U.S. Appl. No. 13/250,970, dated Jul. 30, 2013, 4 pages.
Office Action for U.S. Appl. No. 13/250,994, dated Sep. 16, 2013, 11 pages.
Press Release, "USAF Awards SBG Labs an SBIR Contract for Wide Field of View HUD", SBG Labs—DigiLens, Apr. 2013, 1 page.
Press Release: "Navy awards SGB Labs a contract for HMDs for simulation and training", Press releases, DigiLens, Oct. 2012, pp. 1-2, retrieved from the internat at http://www.digilens.com/pr10-2012.2.php. 2 pages.
Requirement for Restriction/Election on U.S. Appl. No. 13/844,456 dated Sep. 12, 2014, 23 pages.
Schechter, et al., "Compact beam expander with linear gratings", Applied Optics, vol. 41, No. 7, Mar. 1, 2002, pp. 1236-1240.
Urey, "Diffractive exit pupil expander for display applications" Applied Optics, vol. 40, Issue 32, pp. 5840-5851 (2001).
Wisely, P.L., Head up and head mounted display performance improvements through advanced techniques in the manipulation of light, Proc. of SPIE vol. 7327, 732706-1, 2009, 10 pages.
Amendment and Reply for U.S. Appl. No. 12/571,262, dated Dec. 16, 2011, 7 pages.
Amitai, Y., et al. "Visor-display design based on planar holographic optics," Applied Optics, vol. 34, No. 8, Mar. 10, 1995, pp. 1352-1356.
Office Action for U.S. Appl. No. 12/571,262, dated Sep. 28, 2011, 5 pages.
Office Action for U.S. Appl. No. 13/355,360, dated Sep. 12, 2013, 7 pages.
Ayras et al., Exit Pupil Expander with a Large Field of View Based on Diffractive Optics, Journal of the SID, 2009, 6 pages.
Crawford, "Switchable Bragg Gratings", Optics & Photonics News, Apr. 2003, pp. 54-59.
Final Office Action in U.S. Appl. No. 13/864,991, dated Apr. 2, 2015, 16 pages.
Final Office Action on U.S. Appl. No. 13/250,858 dated Feb. 4, 2015, 18 pages.
Final Office Action on U.S. Appl. No. 13/250,940 dated Oct. 17, 2014, 15 pages.
Final Office Action on U.S. Appl. No. 13/892,026 dated Apr. 3, 2015, 17 pages.
Final Office Action on U.S. Appl. No. 13/892,057 dated Mar. 5, 2015, 21 pages.
Irie, Masahiro, Photochromic diarylethenes for photonic devices, Pure and Applied Chemistry, 1996, pp. 1367-1371, vol. 68, No. 7, IUPAC.
Non-Final Office Action on U.S. Appl. No. 13/250,858 dated Jun. 12, 2015, 20 pages.
Non-Final Office Action on U.S. Appl. No. 13/250,858 dated Sep. 15, 2014, 16 pages.

(56) References Cited

OTHER PUBLICATIONS

Non-Final Office Action on U.S. Appl. No. 13/250,940 dated Mar. 18, 2015, 17 pages.
Non-Final Office Action on U.S. Appl. No. 13/432,662 dated May 27, 2015, 15 pages.
Non-Final Office Action on U.S. Appl. No. 13/844,456, filed Apr. 1, 2015, XX Pages.
Non-Final Office Action on U.S. Appl. No. 13/864,991 dated Oct. 22, 2014, 16 pages.
Non-Final Office Action on U.S. Appl. No. 14/038,400 dated Feb. 5, 2015, 18 pages.
Non-Final Office Action on U.S. Appl. No. 14/044,676 dated Apr. 9, 2015, 13 pages.
Non-Final Office Action on U.S. Appl. No. 14/225,062 dated May 21, 2015, 11 pages.
Notice of Allowance for U.S. Appl. No. 12/700,557, dated Oct. 22, 2013, 9 pages.
Notice of Allowance on U.S. Appl. No. 13/250,970 dated Sep. 16, 2014, 7 pages.
Notice of Allowance on U.S. Appl. No. 13/251,087 dated Jul. 17, 2014, 8 pages.
Office Action for U.S. Appl. No. 12/700,557, dated Aug. 9, 2013, 12 pages.
Office Action for U.S. Appl. No. 12/700,557, dated Feb. 4, 2013, 11 pages.
Office Action for U.S. Appl. No. 13/250,858 dated Feb. 19, 2014, 13 page.
Office Action for U.S. Appl. No. 13/250,858, dated Oct. 28, 2013, 9 pages.
Office Action for U.S. Appl. No. 13/250,940, dated Aug. 28, 2013, 10 pages.
Office Action on U.S. Appl. No. 13/250,940 dated Mar. 25, 2014, 12 pages.
Office Action on U.S. Appl. No. 13/251,087 dated Mar. 28, 2014, 12 pages.
Office Action on U.S. Appl. No. 13/892,026 dated Dec. 8, 2014, 19 pages.
Office Action on U.S. Appl. No. 13/892,057 dated Nov. 28, 2014, 17 pages.
Plastic has replaced glass in photochromic lens, www.plastemart.com, 2003, 1 page.
Webster's Third New International Dictionary 433 (1986), 3 pages.
Non-Final Office Action on U.S. Appl. No. 13/844,456, dated Jan. 15, 2016, 16 Pages.
Non-Final Office Action on U.S. Appl. No. 14/044,676, dated Jan. 20, 2016, 21 pages.
U.S. Appl. No. 13/250,858, filed Sep. 30, 2011, Brown et al.
U.S. Appl. No. 13/250,940, filed Sep. 30, 2011, Stahl et al.
U.S. Appl. No. 13/432,662, filed Mar. 28, 2012, Brown et al.
U.S. Appl. No. 14/497,280, filed Sep. 25, 2014, Stanley et al.
U.S. Appl. No. 14/715,332, filed May 18, 2015, Brown et al.
U.S. Appl. No. 14/814,020, filed Jul. 30, 2015, Brown et al.
Extract of US 2010/0296163 (Saarikko), Figure 2 as marked up by Examiner in Final Office Action for U.S. Appl. No. 14/044,676 dated Oct. 20, 2015, 1 page.
Final Office Action on U.S. Appl. No. 14/044,676, dated Oct. 20, 2015, 18 pages.
Final Office Action on U.S. Appl. No. 13/250,858, dated Oct. 7, 2015, 20 pages.
Final Office Action on U.S. Appl. No. 13/432,662, dated Oct. 29, 2015, 9 pages.
Final Office Action on U.S. Appl. No. 13/892,026 dated Nov. 20, 2015, 25 pages.
Final Office Action on U.S. Appl. No. 13/892,057 dated Nov. 20, 2015, 30 pages.
Final Office Action on U.S. Appl. No. 14/152,756, dated Dec. 21, 2015, 15 pages.
Non-Final Office Action on U.S. Appl. No. 14/152,756, dated Aug. 25, 2015, 39 pages.
Notice of Allowance on U.S. Appl. No. 14/038,400, dated Oct. 30, 2015, 9 pages.
Notice of Allowance on U.S. Appl. No. 14/225,062, dated Dec. 2, 2015, 10 pages.
Second office action received in Chinese patent application No. 201380001530.1, dated Oct. 12, 2015, 5 pages with English translation.
Non-final Office Action on U.S. Appl. No. 13/250,858, dated Nov. 14, 2016, 18 pages.
Notice of Reasons for Rejection for Japanese Application No. 2015-509120, dated Nov. 1, 2016, 4 pages.
Final Office Action on U.S. Appl. No. 13/250,858, dated Jul. 11, 2016, 21 pages.
Final Office Action on U.S. Appl. No. 14/044,676, dated Aug. 12, 2016, 23 pages.
Non-Final Office Action on U.S. Appl. No. 13/844,456, dated Aug. 16, 2016, 18 pages.
Non-Final Office Action on U.S. Appl. No. 14/497,280, dated Sep. 22, 2016, 15 pages.
Notice of Allowance on U.S. Appl. No. 14/814,020, dated Aug. 12, 2016, 15 pages.
Chinese Office Action issued in corresponding application No. 201310557623, dated Jan. 17, 2017, 13 pages.
Final Office Action on U.S. Appl. No. 14/497,280, dated Mar. 10, 2017, 17 pages.
Non-Final Office Action on U.S. Appl. No. 13/844,456, dated Dec. 29, 2016, 24 pages.
Non-Final Office Action on U.S. Appl. No. 14/044,676, dated Dec. 29, 2016, 26 pages.
Non-Final Office Action on U.S. Appl. No. 14/715,332, dated Mar. 9, 2017, 14 pages.
Corrected Notice of Allowance for U.S. Appl. No. 14/044,676 dated Feb. 1, 2018. 2 pages.
Final Office Action for U.S. Appl. No. 13/844,456 dated Apr. 19. 2018. 24 pages.
International Search Report and Written Opinion for PCT/US18/12227. dated Mar. 14, 2018. 9 pages.
Non-Final Office Action for U.S. Appl. No. 14/152,756 dated Feb. 13, 2018. 17 pages.
Non-Final Office Action for U.S. Appl. No. 14/497,280 dated Mar. 19, 2018. 19 pages.
Non-Final Office Action for U.S. Appl. No. 15/136,841 dated Mar. 12, 2018. 12 pages.
Notice of Allowance for U.S. Appl. No. 15/005,507 dated May 23, 2017. 8 pages.
Notice of Allowance for U.S. Appl. No. 15/178,521 dated Jan. 31, 2018. 9 pages.
Final Notice of Reasons for Rejection on Japanese Application No. JP2015-509120, dated Mar. 7, 2017, English Translation, 2 pages.
Final Office Action on U.S. Appl. No. 14/152,756, dated Oct. 12, 2016, 18 pages.
First Office Action on EPO Application No. 13765610.4, dated Apr. 18, 2017, 4 pages.
Non-Final Office Action on U.S. Appl. No. 14/152,756, dated Feb. 21, 2017, 18 pages.
Non-Final Office Action on U.S. Appl. No. 15/005,507, dated Nov. 22, 2016, 7 pages.
Final Office Action on U.S. Appl. No. 14/044,676, dated Jul. 13, 2017, 30 pages.
Final Office Action on U.S. Appl. No. 14/152,756, dated Jun. 7, 2017, 16 pages.
Final Office Action on U.S. Appl. No. 14/715,332, dated Aug. 11, 2017, 14 pages.
Final Office Action on U.S. Appl. No. 13/844,456, 19 pages (dated Jul. 10, 2017).
First Office Action on Japanese Application No. 2013-231450, dated Aug. 8, 2017, 5 pages.
Non-Final Office Action for U.S. Appl. No. 13/844,456 dated Oct. 6, 2017. 23 pages.
Non-Final Office Action on U.S. Appl. No. 14/754,368, dated May 8, 2017, 12 pages.
Non-Final Office Action on U.S. Appl. No. 15/178,521, dated Aug. 24, 2017, 10 pages.

(56) References Cited

OTHER PUBLICATIONS

Non-Final Office Action on U.S. Appl. No. 15/136,841, 12 pages (dated Jul. 13, 2017).
Chinese First Office Action for Chinese Patent Application No. 201610512319.1 dated Aug. 11, 2017. 16 pages.
Corrected Notice of Allowance for U.S. Appl. No. 14/044,676 dated Jan. 3, 2018. 2 pages.
European Office Action for European Patent Application No. 13192383.1 dated Oct. 16, 2017. 5 pages.
Final Office Action for U.S. Appl. No. 15/136,841 dated Oct. 27, 2017. 15 pages.
Non-Final Office Action for U.S. Appl. No. 14/715,332 dated Dec. 26, 2017. 8 pages.
Notice of Allowance for U.S. Appl. No. 14/044,676 dated Nov. 24, 2017. 18 pages.
Second Office Action for Chinese Patent Application No. 201310557623.4 dated Dec. 1, 2017. 21 pages.
Corrected Notice of Allowance for U.S. Appl. No. 15/439,597 dated Oct. 19, 2018. 2 pages.
Decision of Rejection for Japanese Patent Application No. 2013-231450 dated May 8, 2018. 4 pages.
Final Office Action for U.S. Appl. No. 14/152,756 dated Aug. 30, 2018. 17 pages.
Final Office Action for U.S. Appl. No. 14/497,280 dated Oct. 18, 2018. 20 pages.
Final Office Action tor U.S. Appl. No. 15/136,841 dated Aug. 31, 2018. 7 pages.
Non-Final Office Action for U.S. Appl. No. 13/844,456 dated Aug. 30, 2018. 17 pages.
Non-Final Office Action for U.S. Appl. No. 15/048,954 dated Jul. 26, 2018. 24 pages.
Non-Final Office Action for U.S. Appl. No. 15/429,569 dated Sep. 17, 2018. 9 pages.
Non-Final Office Action for U.S. Appl. No. 15/460,076 dated Jul. 10, 2018. 15 pages.
Notice of Allowance for U.S. Appl. No. 15/439,597 dated Jun. 15, 2018. 11 pages.
Notice of Allowance for U.S. Appl. No. 15/429,569 dated Jan. 22, 2019. 7 pages.
Second Office Action for Chinese Patent Application No. 201610512319.1 dated May 2, 2018. 9 pages.
Supplemental Notice of Allowability on U.S. Appl. No. 13/892,026, dated Nov. 1, 2016, 2 pages.
Third Office Action for Chinese Patent Application No. 20130557623.4 dated May 22, 2018. 16 pages.
Final Office Action for U.S. Appl. No. 13/844,456 dated Dec. 17, 2018. 20 pages.
Final Office Action for U.S. Appl. No. 15/048,954 dated Jan. 2, 2019. 26 pages.
Final Office Action for U.S. Appl. No. 15/460,076 dated Dec. 3, 2018. 13 pages.
Notice of Allowance for U.S. Appl. No. 15/136,841 dated Nov. 9, 2018. 9 pages.
Third Office Action [With English translation] for CN Application No. 2016105123191 dated Nov. 1, 2018. 16 pages.
Notice of Allowance for U.S. Appl. No. 15/136,841 dated Feb. 1, 2019. 2 pages.
Extended European Search Report for European Application No. 13765610.4 dated Feb. 16, 2016, 6 pages.
Final Office Action on U.S. Appl. No. 14/168,173, dated Nov. 4, 2015, 10 pages.
Non-Final Office Action on U.S. Appl. No. 13/864,991 dated Nov. 30, 2015, 18 pages.
Non-Final Office Action on U.S. Appl. No. 13/892,026 dated Mar. 22, 2016, 16 pages.
Non-Final Office Action on U.S. Appl. No. 14/152,756, dated Apr. 26, 2016, 17 pages.
Non-Final Office Action on U.S. Appl. No. 14/168,173 dated Mar. 10, 2016, 9 pages.
Non-Final Office Action on U.S. Appl. No. 14/260,943 dated Feb. 3, 2016, 19 pages.
Non-Final Office Action on U.S. Appl. No. 13/250,858, dated Mar. 18, 2016, 20 pages.
Notice of Allowance for U.S. Appl. No. 14/109,551, dated Nov. 20, 2015, 8 pages.
Notice of Allowance on U.S. Appl. No. 13/432,662, dated Feb. 18, 2016, 10 pages.
Final Office Action for U.S. Appl. No. 14/152,756 dated Jun. 10, 2019. 18 pages.
Non-Final Office Action for U.S. Appl. No. 13/844,456 dated Apr. 1, 2019. 21 pages.
Notice of Allowance for U.S. Appl. No. 14/497,280 dated May 22, 2019. 14 pages.
Notice of Allowance for U.S. Appl. No. 15/460,076 dated May 8, 2019. 10 pages.
Fourth Office Action for Chinese Patent Application No. 2016105123191 dated Apr. 25, 2019. 5 pages.
Non-Final Office Action for U.S. Appl. No. 15/048,954 dated Jul. 9, 2019. 22 pages.
Corrected Notice of Allowance for U.S. Appl. No. 14/497,280 dated Aug. 7, 2019. 2 pages.
Final Office Action for U.S. Appl. No. 13/844,456 dated Aug. 16, 2019. 28 pages.

| INCIDENT ANGLES [DEGREES] | | PERIOD [LINES/um] | | | | | | |
|---|---|---|---|---|---|---|---|---|
| IN AIR | IN GLASS | 1.55 | 1.65 | 1.75 | 1.85 | 1.95 | 2.05 | 2.10917 |
| | | EXIT ANGLE [DEGREES] | | | | | | |
| -71.57 | -38.66 | | | | | | | |
| -43.15 | -26.77 | 90 | | | | | | |
| -40 | -25.06 | 80.05 | | | | | | |
| -37.23 | -23.48 | 73.713 | 84.93 | | | | | |
| -34.22 | -21.73 | 68.7 | 75.45 | 90 | | | | |
| -30.96 | -19.8 | 64.19 | 69.46 | 76.57 | 90 | | | |
| -27.47 | -17.69 | 59.91 | 64.35 | 69.66 | 76.87 | 90 | | |
| -23.75 | -15.38 | 55.75 | 59.64 | 64.03 | 69.27 | 76.29 | 90.0 | |
| -21.01 | -13.65 | 52.89 | 56.48 | 60.45 | 64.98 | 70.45 | 78.12 | 89.96 |
| -17.08 | -11.15 | 49.01 | 52.28 | 55.81 | 59.71 | 64.11 | 69.37 | 73.20 |
| -12.97 | -8.50 | 45.17 | 48.20 | 51.42 | 54.88 | 58.66 | 62.92 | 65.75 |
| -8.73 | -5.74 | 41.41 | 44.23 | 47.21 | 50.36 | 53.73 | 57.40 | 59.76 |
| -4.39 | -2.89 | 37.72 | 40.39 | 43.18 | 46.09 | 49.17 | 52.46 | 54.52 |
| 0.00 | 0.00 | 34.15 | 36.70 | 39.33 | 42.07 | 44.93 | 47.94 | 49.81 |
| 4.39 | 2.89 | 30.73 | 33.17 | 35.69 | 38.29 | 40.98 | 43.79 | 45.52 |
| 8.73 | 5.74 | 27.48 | 29.84 | 32.27 | 34.76 | 37.32 | 39.98 | 41.60 |
| 12.97 | 8.50 | 24.43 | 26.73 | 29.08 | 31.48 | 33.95 | 36.49 | 38.03 |

LIGHT PROPAGATES INSIDE THE WAVEGUIDE BETWEEN 90 DEGREES TO THE NORMAL (I.E. PARALLEL TO THE SUBSTRATE SURFACE AND THE TOTAL INTERNAL REFLECTION (TIR) ANGLE OF THE SUBSTRATE

OPTICAL DISPLAYS

CROSS-REFERENCE TO RELATED APPLICATIONS

The present application claims the benefit of and priority to and is a Continuation of U.S. patent application Ser. No. 13/355,360, filed Jan. 20, 2012, which claims the benefit of and priority to and is a Continuation of U.S. patent application Ser. No. 12/571,262 filed on Sep. 30, 2009, both of which are hereby incorporated by reference in their entireties.

BACKGROUND

The present disclosure relates generally to the field of display optics. More specifically, the disclosure relates to substrate guided optics.

Conventional solutions for wide field of view Head Mounted Displays (HMDs) (e.g., a helmet mounted display) and Head Up Displays (HUDs) generally include off-axis visors, combiners, and multiple complex tilted and decentered lenses. The field of view that can be achieved with conventional fixed diffractive components may be limited to less than about 30 degrees external angle. This limited field of view may not meet requirements for digital night vision systems and wide field of view HUDs or HMDs.

Conventional HMD optical designs, such as those for the Joint Helmet Mounted Cueing System (JHMCS), the Joint Strike Fighter (JSF), and the Eurofighter Typhoon, use complex tilted and decentered, aspheric plastic lenses. For example, the JSF HMD incorporates seven lenses in order to correct the off-axis aberrations induced by the visor. These lens elements are expensive, tolerance limited, and require precision tooling to assemble.

The optical performance of conventional visor-projected designs, typically fall off with exit pupil and field of view and barely meet the Modulation Transfer Function (MTF) performance required for night vision sensors.

A reduction in mass at the HMD system level is desirable for a number of reasons. To establish the effects of head supported mass during flight, the mass is multiplied by the aircraft acceleration. For high performance fighter aircraft pulling a 10G turn, the mass of the HMD is multiplied by 10. Head supported mass also affects the induced neck loads during parachute deployment, HMD components, especially the optics, tend to be oriented forward and upward in the helmet. Neck strain during normal flight can be exacerbated by this forward center of mass, for example, induced neck forces during ejection and parachute deployment may be worsened by an upward and forward center of mass.

What is needed is an optical system having a lower mass. What is also needed is an optical system that does not need an IPD adjustment mechanism. What is also needed is an optical system having a smaller volume lens system. What is further needed is an optical system having a smaller volume display module. What is further still needed is an optical system having a lower cost. What is further still needed is an optical system without the need for a custom fit system.

SUMMARY

One exemplary embodiment of the disclosure relates to an apparatus for providing an optical display. The apparatus includes an optical substrate for propagating light received from a light source, a first set of one or more switchable diffractive elements in the substrate, and a second set of one or more switchable diffractive elements in the substrate. Each diffractive element in the second set corresponds to a diffractive element in the first set. Each of the diffractive elements in the first and second sets is configured to diffract light when switched off and allow light to pass through when switched on. Each of the first set of diffractive elements is configured to diffract the light at an angle for propagation in the substrate. Each of the second set of diffractive elements is configured to diffract the light for display.

Another exemplary embodiment of the disclosure relates to an apparatus for providing an optical display. The apparatus includes a substrate for propagating light received from a light source, a first set of one or more switchable Bragg gratings or holographic polymer dispersed liquid crystal devices in the substrate, and a second set of one or more switchable Bragg gratings or holographic polymer dispersed liquid crystal devices in the substrate. Each Bragg grating or liquid crystal device in the second set corresponds to a Bragg grating or liquid crystal device in the first set. Each of the Bragg gratings or liquid crystal devices in the first and second sets is configured to switch between on and off states, one of the states for diffracting light and the other state for allowing light to pass through. Each of the first set of Bragg gratings or liquid crystal devices is configured to diffract the light at an angle for propagation in the substrate. Each of the second set of Bragg gratings or liquid crystal devices is configured to diffract the light for display.

Another exemplary embodiment of the disclosure relates to an apparatus for providing an optical display. The apparatus includes means for propagating light received from a light source, means for diffracting light at an input or allowing light at the input to pass through based on a switching state, and means for diffracting propagated light to an output for display or allowing propagated light to pass through based on the switching state. Each means for diffracting propagated light corresponds to a means for diffracting light at an input.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
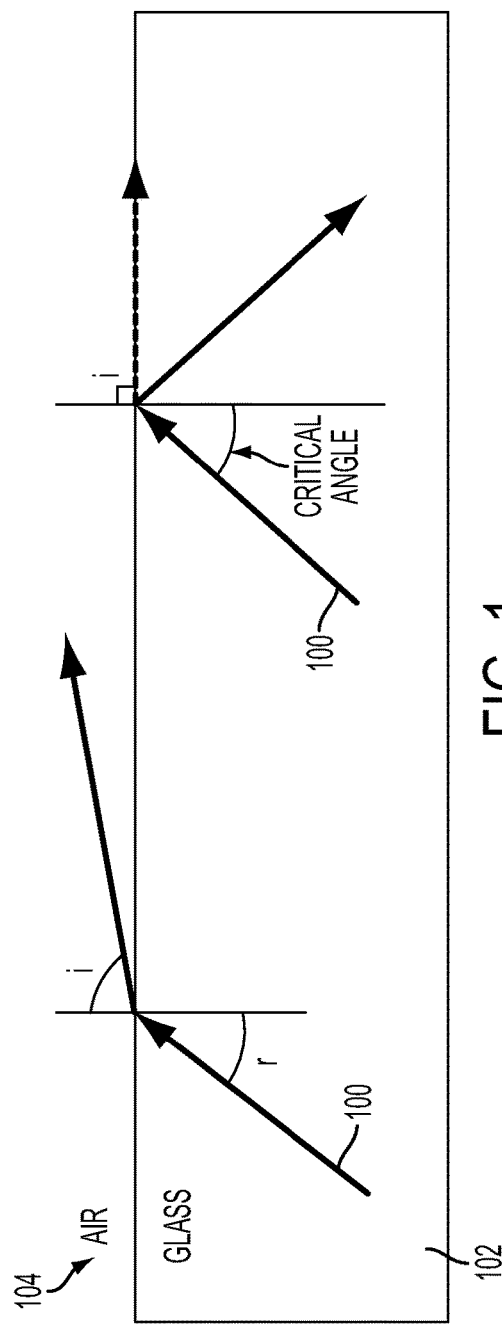
FIG. 1 is a diagram showing light passing through glass and air, according to an exemplary embodiment.

Referring to FIG. 1, a light wave 100 may pass through a glass or plastic layer 102 and an air layer 104, according to an exemplary embodiment. The refractive index of glass/plastic 102 may be found using Snell's equation: Sine i/Sine r=refractive index. The largest angle of incidence in which light wave is refracted out of glass/plastic 102 is called the critical angle ($r_c$). In air, when i=90°, Sine $r_c$=1/refractive index, so for propagation in a waveguide (parallel surfaces of optical medium) the allowable angle range is $r_c$ to r=90°. Practically speaking, for substrate guided optics, the internal angle range is generally much smaller and equates to an external angle of about 20° to 30°.

Figure 2:
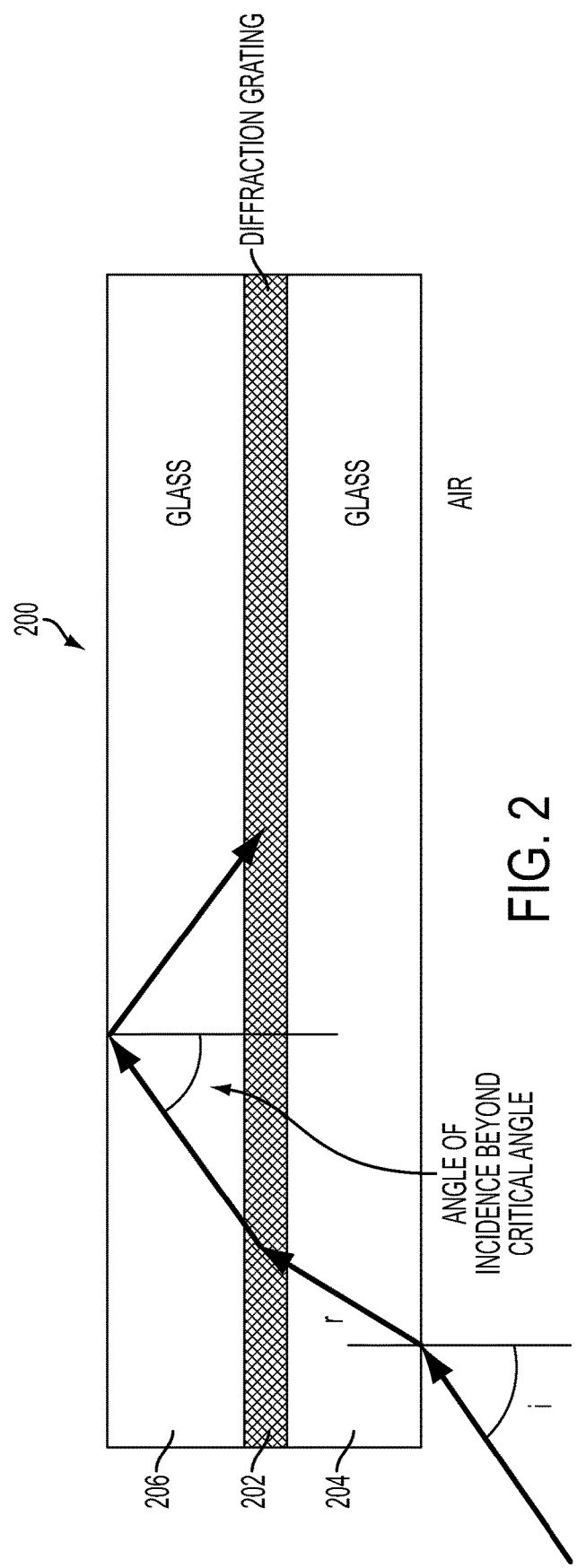
FIG. 2 is a diagram showing light passing through glass and a diffraction coupling, according to an exemplary embodiment.

Referring to FIG. 2, light enters a substrate or waveguide 200 and is diffracted by a diffraction grating 202 between a glass layer 204 and another glass layer 206. Diffraction grating 202 adjusts the angle of the light passing through glass 204 so that the angle of the light as it meets the upper surface of glass 206 is beyond the critical angle and it reflects internally in waveguide 200. The light will then pass back through grating 202 and glass layer 204 and exit into the air at a different point than it entered glass layer 204. According to various exemplary embodiments, diffraction grating 202 may be a thick phase transmission hologram, a reflection hologram, a Bragg grating, binary or uniform optics, or another surface grating or diffractive surface.

For example, co-owned U.S. Pat. No. 5,856,842, which is herein incorporated by reference in its entirety, shows how light from a far field object (where the light is substantially collimated) can be coupled into a waveguide and out again by diffractive means, for example in a periscope. The far field object can also be created by a collimating lens in the same manner that an HMD or HUD images light from a display device, for example a CRT or flat panel display (e.g., an LCD display, a plasma display, etc.). The optics of the periscope may be used to displace the light from a collimating lens and can be used in an HMD, a HUD, or eyewear, for example a combiner in a conventional HMD or HUD.

Figures 3, 4:
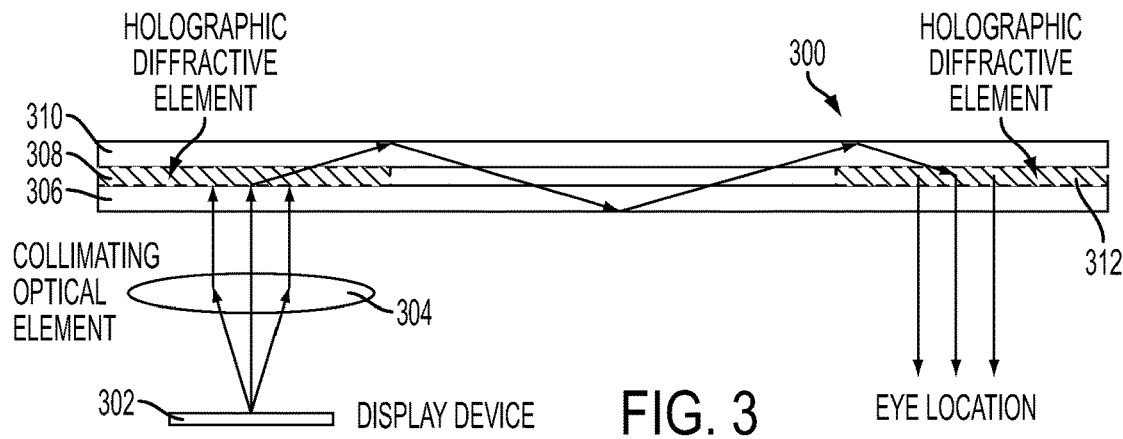
FIG. 3 is a diagram showing light from a display device propagating through a waveguide, according to an exemplary embodiment.
FIG. 4 is a chart illustrating calculated external angles for a diffractive optical element that couples light into or out of a waveguide, according to an exemplary embodiment.

Referring to FIG. 3, a simplified holographic waveguide 300 receives light transmitted from a display device 302 and through a collimating element 304. The light passes through a glass (or optical plastic or other transparent) layer 306 and a diffractive element 308 (e.g., a holographic diffractive element), which is configured to diffract the light at a different angle. The diffracted light has an angle greater than the critical angle of a glass layer 310 and glass layer 306 and thus propagates internally to a second diffractive element 312. Element 312 is configured to diffract the light out of waveguide 300, for example to an eye location. Because the diffractive power of in-coupling diffractive surface 308 is the same as out-coupling diffractive surface 312, the input and output angles are the same. This is generally true for any wavelength and thus there may be no chromatic aberration in the system.

Light propagation may be limited within a range of angles, for example the total internal reflection (TIR) is about 41 degrees to the substrate normal for glass. This range of angles can be extended slightly using a reflective coating, but this may diminish the transparency of the substrate. Light propagation may also be limited by light parallel to the surface (90 degrees to the surface normal). Light coupled into waveguide 300 using diffractive element 308 therefore has a range of angles that relates to the power of diffractive element 308 (e.g., diffraction grating line spacing) and refraction out of element 308.

Referring to FIG. 4, these conditions have been tabulated in a chart 400 to show that the range of the external angles coupling into the waveguide or out of the waveguide may have a theoretical limit of about 30 degrees, according to an exemplary embodiment using BK-7 optical glass. Chart 400 shows an analysis of the external angles that can be employed versus the internal limits of the waveguide and how the range of external angles vary depending upon the grating spacing. Light propagates inside the waveguide (e.g., waveguide 300) between 90 degrees to the normal and the TIR angle of the substrate. In the illustrated example, the incidence angle in air at the substrate (field of view) is between −23.75 degrees and 4.39 degrees, giving a range of 28.14 degrees or less than 30 degrees.

The practical limit of the external angles is far less than 30 degrees. In another example, a limit of 20 degrees has been set for discussion purposes and as a representation of a reasonable limit for the angular bandwidth of a typical hologram. At system level, in order to expand the field of view well beyond about 20-30 degrees more than one hologram may be used. Each hologram diffracts light from a cone of external angles (e.g., about 20 degrees range) into the waveguide and propagates the light within the range of allowable angles supported by the waveguide (between 90 degrees and the TIR condition). However, the external angles of each hologram can be offset with respect to the other hologram by changing the diffractive power.

Figure 5:
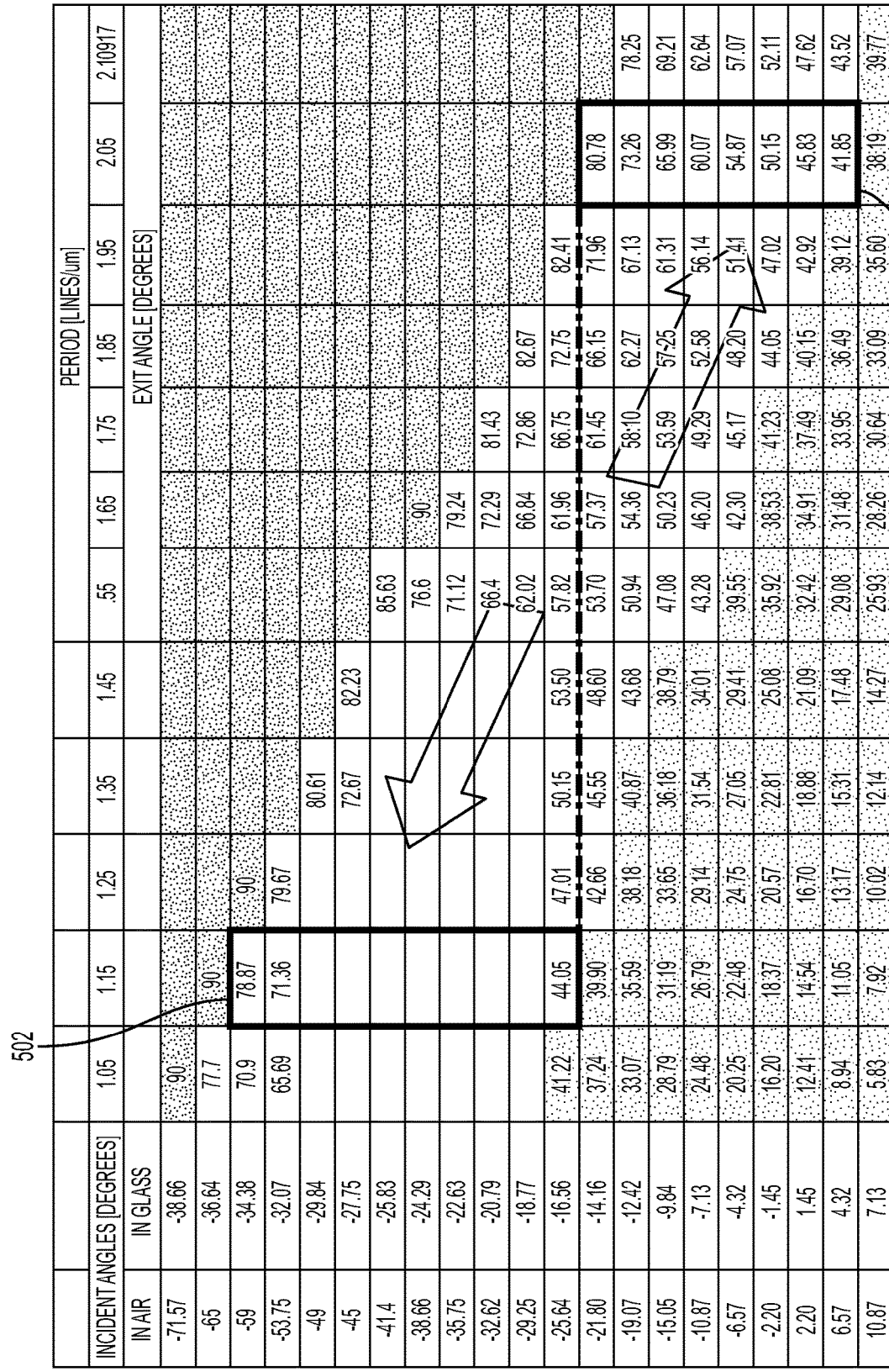
FIG. 5 is a chart illustrating calculated external angles for a diffractive optical element using two holograms to expand the field of view of a waveguide, according to an exemplary embodiment.

Referring to FIG. 5, a chart 500 illustrates that two holograms can couple light within the allowable angles of the substrate with external angles adding up to more than 30 or 40 degrees to expand the field of view of the system, according to an exemplary embodiment. If diffraction gratings 502 and 504 are applied, the field of view of the system in this example is expanded between about −59 degrees and about 6.57 degrees or to approximately 70 degrees (angle in air).

Figure 6:
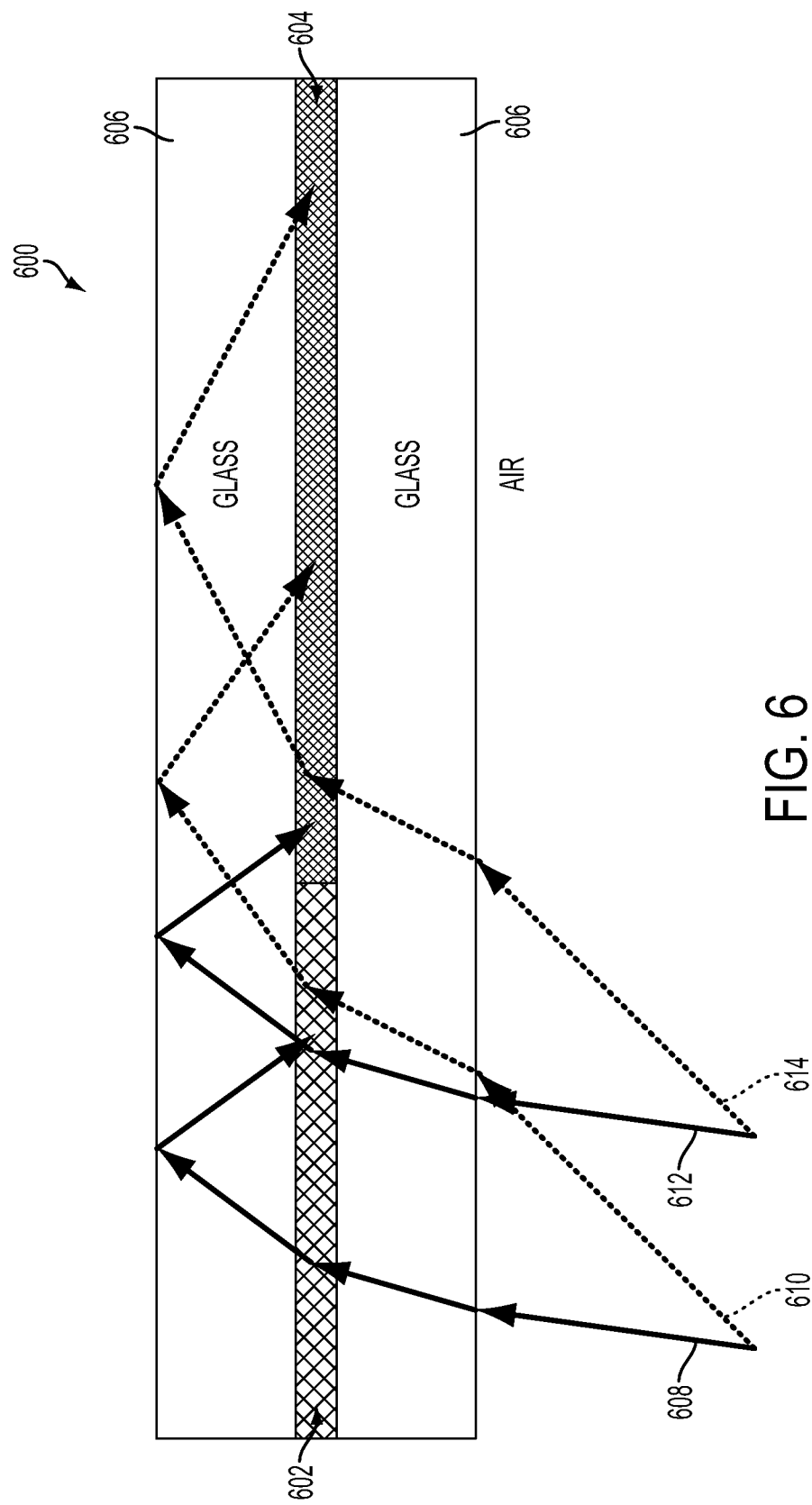
FIG. 6 is a diagram showing light propagating through a waveguide including multiple diffractive surfaces, according to an exemplary embodiment.

Referring to FIG. 6, a waveguide 600 includes two diffractive surfaces 602 and 604 in a substrate 606 to extend the field of view of the system, according to an exemplary embodiment. A light ray or wave 608 and a light ray 610 form a first field of view angle and both fall incident on diffractive surface 602. A light ray 612 and a light ray 614 form a second field of view angle and fall incident on diffractive surfaces 602 and 604 causing the behavior of the light to be different (shown here as diverging light rays). If the light from rays 612 and 614 hit out-coupling diffractive surface 604, the resultant image will be a double image. If the light is broad band (e.g. 50 nm from an LED), then the difference in diffractive power between in-coupling diffractive element 602 and out-coupling diffractive element 604 may also induce chromatic aberration.

Figure 7:
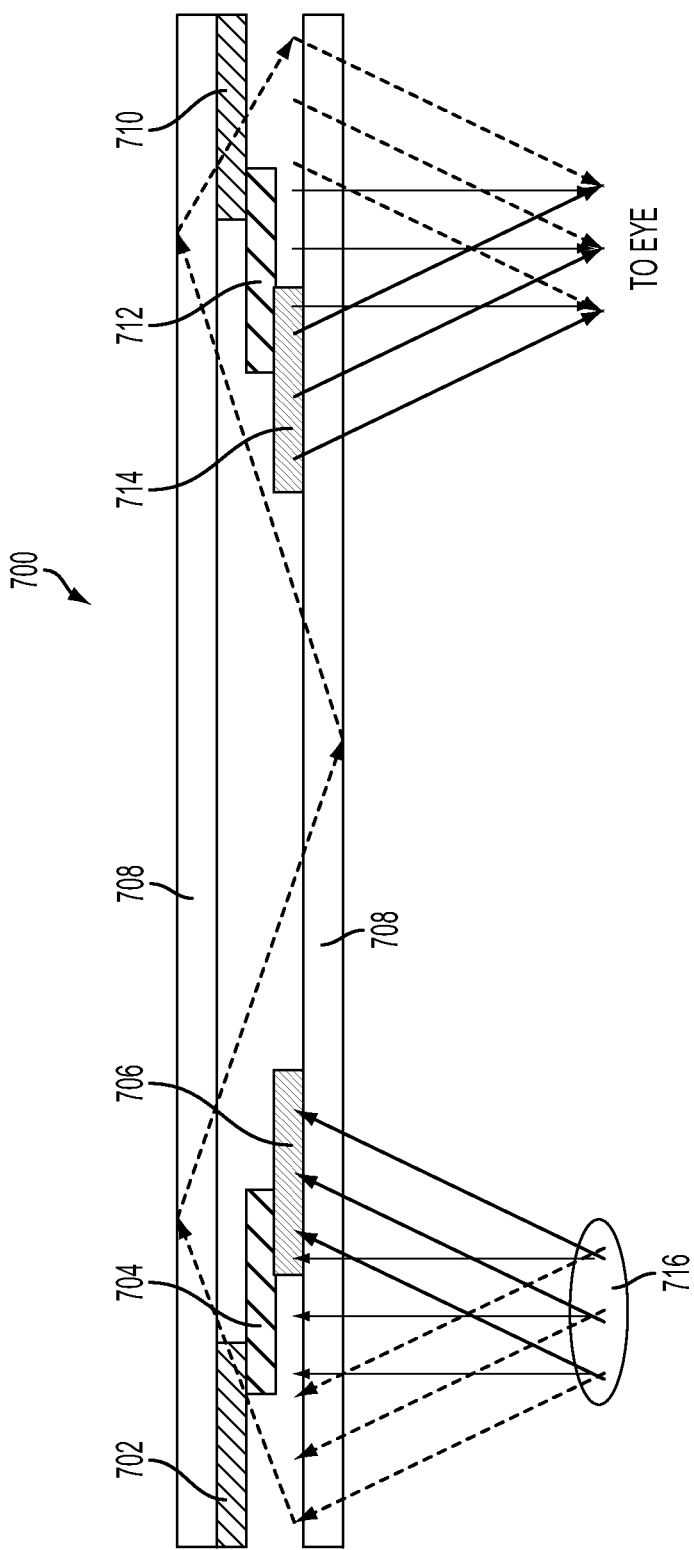
FIG. 7 is a diagram showing light propagating through a waveguide including multiple diffractive surfaces, according to another exemplary embodiment.

Referring to FIG. 7, a waveguide 700 illustrates how in-coupling switchable diffractive elements and out-coupling diffractive elements can be paired up and switched in and out (on and off or vice versa) so that the output light does not suffer from image doubling and chromatic aberration, which would be present if trying to use non-switchable diffraction elements as discussed earlier. Waveguide 700 includes diffractive elements 702, 704, and 706 (e.g., switchable diffractive elements such as electronically switchable Bragg gratings or Holographic Polymer Dispersed Liquid Crystal (HPDLC)) in substrate 708 at an input portion and diffractive elements 710, 712, and 714 in substrate 708 at an output portion. Output diffractive elements 710, 712, and 714 have the equal and opposite diffractive power as corresponding input diffractive elements 702, 704, and 706, respectively. In the illustrated exemplary embodiment, light is received by a collimating device 716 from three different angles. The input collimating lens generates a field of view that is needed for the optical display system (e.g., HMD, HUD, eyewear, etc.). According to some exemplary embodiments, the collimating lens may be integrated with diffractive elements 702, 704, 706, while in other exemplary embodiments, the collimating lens may be separate. At any point in time, only one of each input element 702, 704, or 706 may be operational or switched on along with its corresponding output element 710, 712, or 714 and all elements may switch consecutively within the frame time of the system. Light does not couple into waveguide 700 until it hits a diffractive element (702, 704, or 706) that is operational. Therefore, only light from one angle range is coupled into waveguide 700 at any one point in time. Further, light does not couple out of the substrate until it hits the diffraction element that is operational.

According to the illustrated example, a single parallel beam of light shown by dashed lines hits diffraction surface 702 and is diffracted into waveguide 700 until it hits complimentary diffractive surface 710 and is diffracted out of waveguide 700 at the same angle as it enters waveguide 700. Because the input diffractive power is equal and opposite to the output diffractive power no chromatic aberration is induced in the system. It is noted that while the FIGURE illustrates use of three input and output switchable diffractive elements, according to other exemplary embodiments, more or fewer than three switchable diffractive elements may be used. It is also noted that while the FIGURE illustrates reception and output of light at three different angles, the figure does not include the light in the range between the three field angles shown. The light incident on each of the diffractive surfaces are in a range limited by the geometric limits described herein for a single fixed diffractive surface and are therefore in a range tabulated in FIG. 4 and limited to about 30 degrees.

Figure 8A:
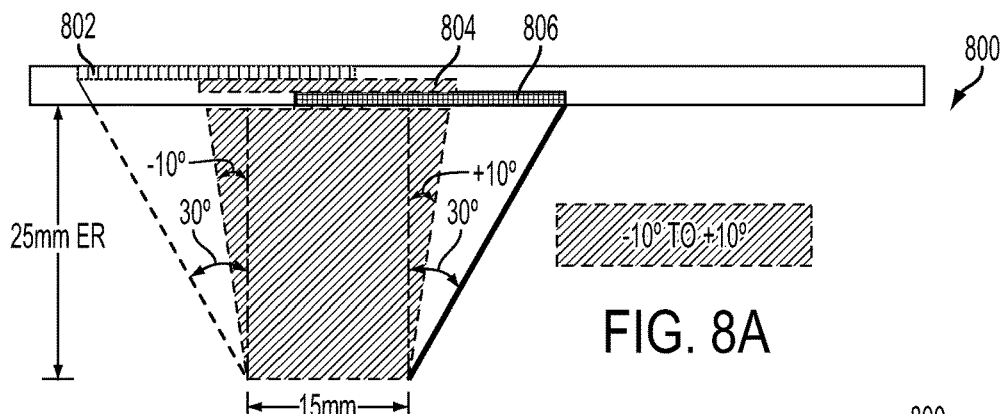
FIGS. 8A-8D are diagrams showing light exiting the waveguide of FIG. 7, according to an exemplary embodiment.
Figure 8B:
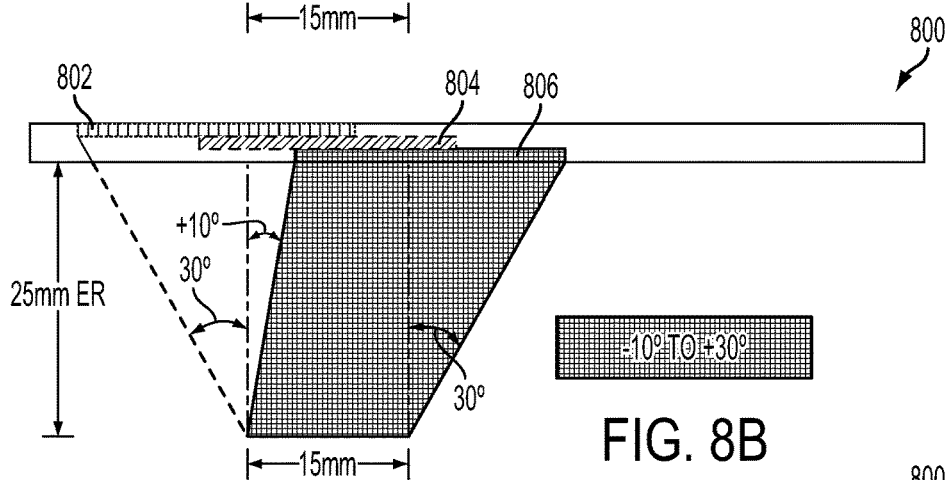
Figure 8C:
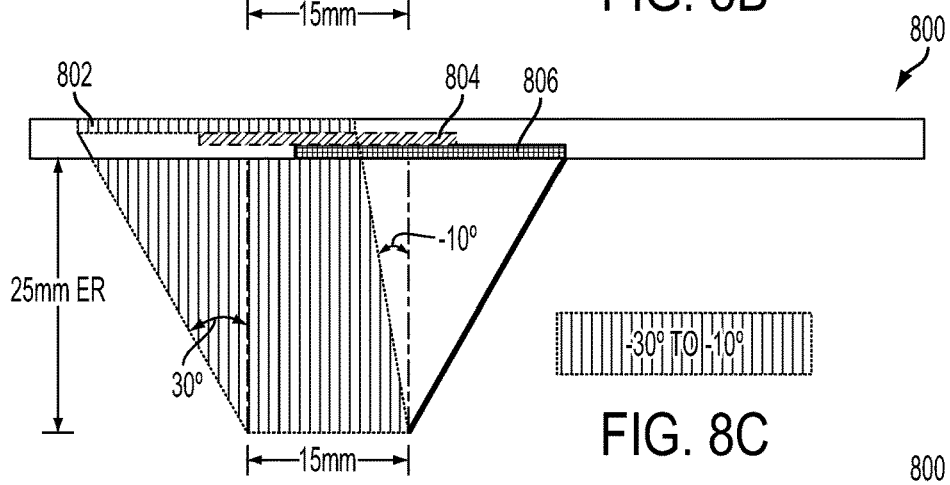
Figure 8D:
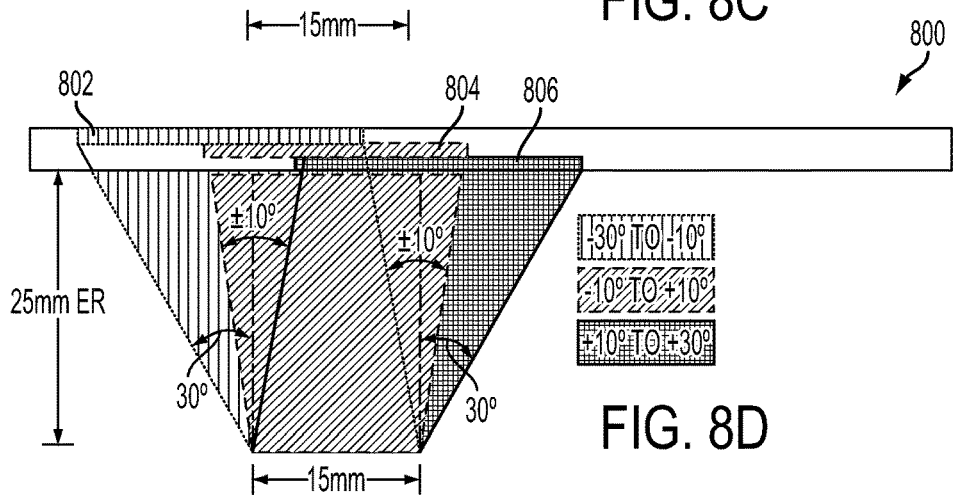

Referring to FIGS. 8A-8D, a first order geometry of output holograms for a waveguide 800 is illustrated, according to an exemplary embodiment. For purposes of this example, the exit pupil of the system was set at about 15 mm (which is generally regarded as the minimum acceptable exit pupil of an HMD or eyewear although according to other exemplary embodiments exit pupils much greater than 15 mm may be used) with an eye-relief of about 25 mm (the minimum requirement for wearing aviator spectacles). The first order geometry plots a 60 degree field of view using three holograms 802, 804, and 806, each with a field of view of about 20 degrees. FIG. 8A shows the first order geometry for the central 20 degrees (plus and minus 10 degrees from normal), FIG. 8B shows the right 20 degrees (10 to 30 degrees from the left normal), FIG. 8C shows the left 20 degrees (−10 and −30 degrees from the right normal), and FIG. 8D shows the full 60 degrees of the holographic waveguide display with three overlapping holograms. The practical implementation of using multiple switchable diffractive surfaces in an HMD, HUD, or eyewear therefore includes overlapping switchable diffractive surfaces. This includes the illustration of FIG. 7, which shows a simplified version where the diffractive surfaces are adjacent to each other.

For an extended field of view and an extended exit pupil, the footprint of the light rays for exemplary 20 degree sections overlaps at waveguide 800. The overlap may be decreased with increasing eye-relief and may be increased with increasing exit pupil size. For example, if the system has an exit pupil of 30 mm, then the overlap will be significant. Overlapping holograms cannot be employed within the same waveguide using conventional holographic material because the rays for each hologram would be indistinguishable from one another since they fall within the same range of internal waveguide angles.

According to some exemplary embodiments, multiple holograms that overlap with each other and are separated by an air space may be used, however, implementation of a mechanism for a curved visor or much greater field of view may be difficult and not lend itself to a low mass and mechanically stable solution. According to other exemplary embodiments, Switchable Bragg Gratings (SBG) (e.g., electronically switchable Bragg gratings) may be used as the diffractive element, for example as developed by SBG Labs, Inc. of Silicon Valley, Calif. According to other exemplary embodiments, switchable transmission holograms or switchable reflection holograms may be used to develop wider fields of view.

A waveguide (e.g., waveguide 700 or 800) may include multiple holograms (e.g., holograms 702,704, and 706 or holograms 802, 804, and 806) of different powers. An SBG stack can be used that can be switched sequentially to build up the field of view of the optics This allows a setup of overlapping holograms as illustrated in FIGS. 7 and 8.

Figure 9:
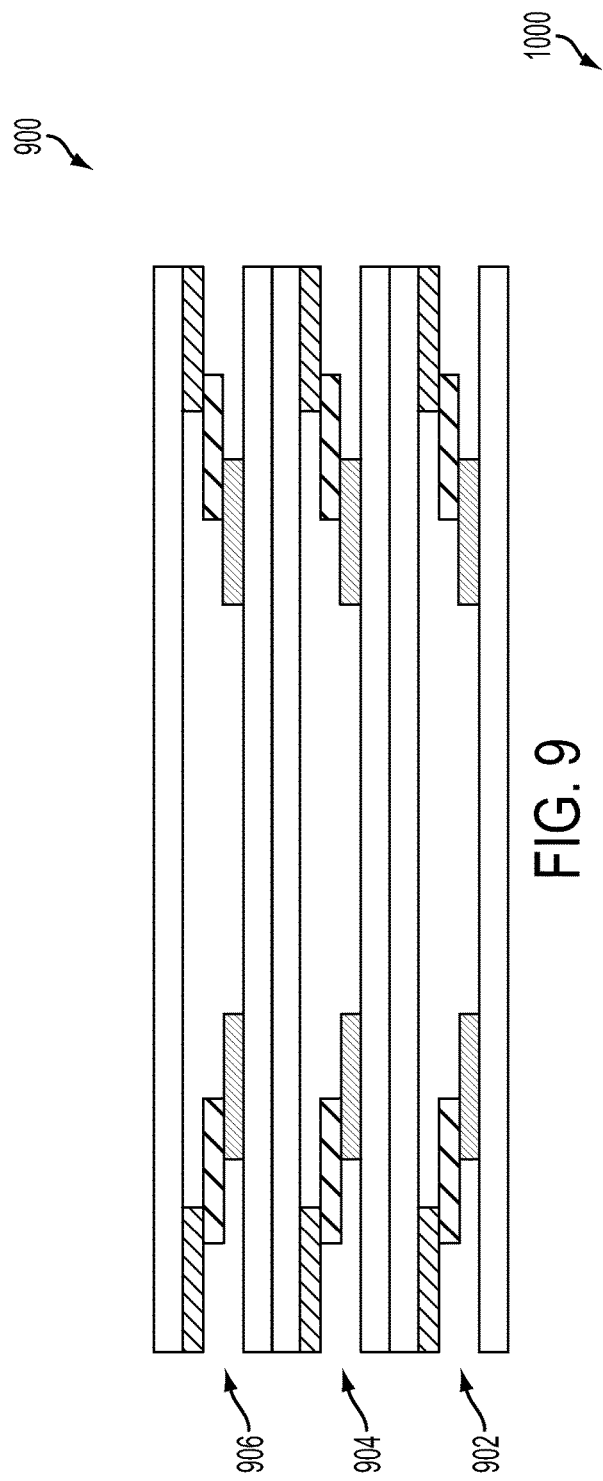
FIG. 9 is a diagram showing multiple stacked instances of the waveguide of FIG. 7, according to an exemplary embodiment.

Referring to FIG. 9, a waveguide system 900 may include multiple stacks of SBG holograms 902, 904, and 906 that are at least similar to each other, according to an exemplary embodiment. Such a system 900 may be used to generate color displays in sequential mode. Frame sequential color and frame sequential wide field of view have similar coordination between the display data, the illumination source, and the SBGs. Each SBG stacks 902, 904, and 906 may be used to propagate a different color, for example, red, blue, and green. At any given point in time, one set of input and output holograms may be switched on to diffract light of a specific color and all holograms will switch within the frame time of the system at a rate sufficient so a human eye will not perceive flicker (e.g., about 16 milliseconds). According to other exemplary embodiments, different color schemes may be used or more or fewer than three switchable diffractive stacks may be used.

Figure 10:
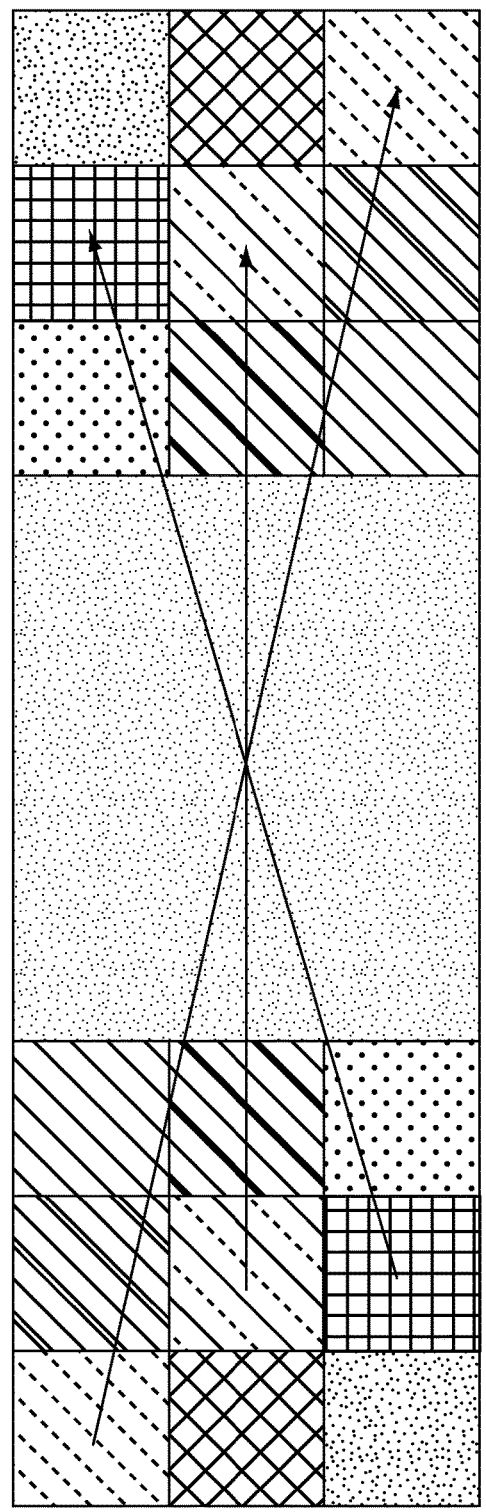
FIG. 10 is a top view of the waveguide of FIG. 7, according to an exemplary embodiment.

Referring to FIG. 10, while the waveguides have been illustrated as having single rows of diffractive elements thus far, according to other exemplary embodiments, a waveguide 10000 may include an in-coupling surface 1002 and an out-coupling diffractive surface 1004 that are paired up in a two dimensional array and have equal and opposite diffractive power. The input light may be generated using a collimating lens placed at exit pupil distance from the in-coupling diffractive array. The exit pupil of the lens may be of similar dimensions as for an HMD, HUD, or eyewear display system. The diffractive arrays concept may be used with broadband light sources and so lasers are not required in order to make the system work. It is noted that as in FIG. 8, due to the first order geometry of exit pupil and eye relief and the desire to have a contiguous field of view, overlapping switchable diffractive devices may be used in a practical implementation for an HMD, HUD, or eyewear.

According to other exemplary embodiments, the diffractive power on the input coupling diffractive elements can include additional diffractive power that can be used to color correct chromatic aberrations in the collimating lens. According to some exemplary embodiments, the waveguides described above may be used with a device that can be controlled to illuminate pixels at specific times. According to some exemplary embodiments, the waveguide system can utilize a beamsplitter in the middle of the sandwich to expand the exit pupil. Therefore, the input lens may be much smaller than for the exit pupil.

According to various exemplary embodiments, various light sources may be used to provide light waves to the waveguides described above. For example, a broad band light source such as an LED may be used with holographic waveguide displays. Chromatic dispersion induced by high power diffractive elements generally need to be negated by diffractive elements of equal and opposite power. In the case of a holographic waveguide display, this can be done by employing the same power diffractive element to couple light into and out of the waveguide. For an expanded field of view system employing switchable Bragg gratings, this same concept can be applied by using complimentary pairs of stacked SBGs for the in-coupling and out-coupling diffractive elements, as described above.

Figure 11:
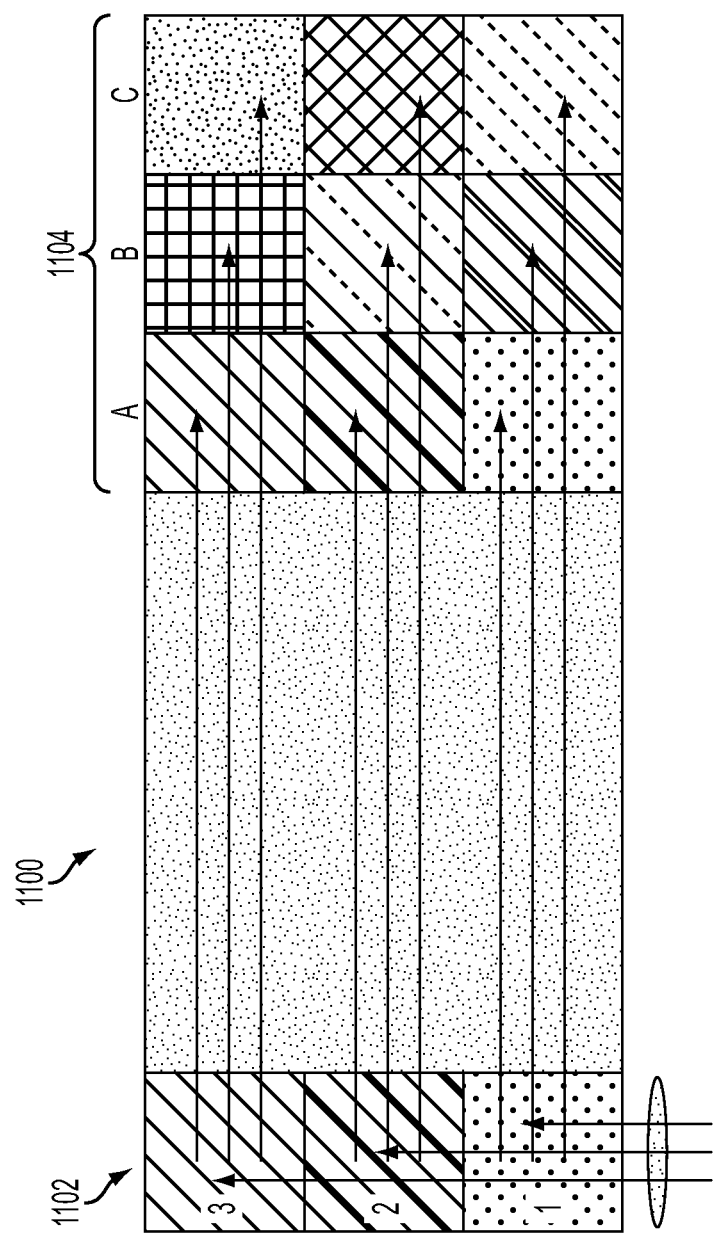
FIG. 11 is a top view of a waveguide having a laser input, according to an exemplary embodiment.

Referring to FIG. 11, compact and low cost lasers have become available (e.g. Necsel lasers available from Novalux, Inc. of San Francisco, Calif.) and represent an ideal light source for use with high diffractive power optics. Complimentary pairs of diffractive elements are not required for a holographic waveguide display 1100 employing one or more lasers, according to an exemplary embodiment. Because a laser has a very narrow spectrum, the diffractive power on an input coupling diffractive surface 1102 and an output coupling diffractive surface 1104 does not have to be balanced. Input diffractive elements 1102 are tiled 1, 2, 3 and the output diffractive elements are shown as columns A, B, C. In one example, the sequence of switching tiles may be 1 and 1A, then 1 and 1B, then 1 and 1C, then 2 and 2A, then 2 and 2B, etc. If the input device is a laser micro-mems scanner, which generally has a small field of view, the system may be able to expand this field of view sequentially using a high frame rate. The imaging device may also be a low resolution imager with a high frame rate, for example a ferro-electric crystal device.

Holographic lenses can be applied in the system that will reduce the size and mass of the final system. Lasers are highly efficient and already polarized, which enables low power HMDs, HUDs, or eyewear displays to be generated for applications such as soldier systems where battery power is a limiting factor.

Laser speckle is an issue that has hindered the introduction of laser illuminated. Easily recognizable as a sparkly or granular structure around uniformly illuminated rough surface, speckle arises from the high spatial and temporal coherence of Lasers. The resulting viewer distraction and loss of image sharpness has been an obstacle to commercialization of laser projectors. The benchmark for most applications is a speckle contrast of 1% (speckle contrast being defined as the ratio of the standard deviation of the speckle intensity to the mean speckle intensity). Mechanical methods such as rotating diffusers and vibrating screens suffer from problems of noise, mechanical complexity and size. Other passive techniques using diffractive, MEMs or holographic elements, microlens arrays and others have met with limited success. According to some exemplary embodiments, a despeckler based on an SBG that is compact, low cost, silent, easily integrated, and applicable to any type of laser display may be used, for example a despeckler developed by SBG Labs. This solution may also provide functions of beam combining, beam shaping, and homogenization integrated in a single module.

While the detailed drawings, specific examples, and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the communications devices. For example, the type of system components and their interconnections may differ. The systems and methods depicted and described are not limited to the precise details and conditions disclosed. The figures show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. An apparatus for providing light from a light source to an eye location, comprising:
   a substrate having a first glass layer and a second glass layer;
   a first set of fold gratings disposed between the first glass layer and the second glass layer in the substrate arranged to receive light from the light source and to diffract the received light in a first direction as first diffracted light for propagation in the substrate; and
   a second set of output gratings disposed between the first glass layer and the second glass layer in the substrate arranged to receive the first diffracted light and to diffract the first diffracted light in a second direction as second diffracted light to the eye location, wherein the first direction is different from the second direction, wherein the first set of fold gratings, the second set of output gratings, the first glass layer and the second glass layer are part of a same waveguide structure.

2. The apparatus of claim 1, wherein the first direction is orthogonal to the second direction.

3. The apparatus of claim 1, wherein the first direction is orthogonal to an incident light direction of the light received from the light source.

4. The apparatus of claim 1, further comprising a collimating device for providing light from the light source to the first set of fold gratings.

5. The apparatus of claim 4, wherein the collimating device comprises a diffractive lens.

6. The apparatus of claim 1, wherein the apparatus is mounted in a head mounted display, a heads-up display, or eyewear.

7. The apparatus of claim 1, wherein the first set of fold gratings and the second set of output gratings comprise one or more of Bragg gratings or gratings recorded in holographic polymer dispersed liquid crystal.

8. The apparatus of claim 1, wherein the diffractive power of each of the first set of fold gratings is the same as each of the second set of output gratings.

9. The apparatus of claim 1, wherein the light source is a laser.

10. The apparatus of claim 1, wherein the light from the light source comprises light waves from varying angles, and each of the gratings in the first and second sets are configured to diffract light from a specific set of angles.

11. The apparatus of claim 1, wherein the apparatus is a holographic waveguide display.

12. The apparatus of claim 1, wherein the apparatus expands the field of view of the light source.

13. An apparatus for providing light from a light source to an eye location, comprising:
   a substrate having a first glass layer and a second glass layer;
   a first set of fold gratings, disposed between the first glass layer and the second glass layer, arranged to receive light from the light source and to diffract the received light in a first direction as first diffracted light for propagation in the substrate; and
   a second set of output gratings, disposed between the first glass layer and the second glass layer, arranged to receive the first diffracted light and to diffract the first diffracted light in a second direction as second diffracted light to the eye location, wherein the first direction is different from the second direction,
   wherein the first set of fold gratings, the second set of output grating, the first glass layer and the second glass layer are part of a same waveguide structure,
   wherein the display expands the field of view of the light source.

14. The apparatus of claim 13, wherein the first direction is orthogonal to the second direction.

15. The apparatus of claim 13, wherein the first direction is orthogonal to an incident light direction of the light received from the light source.

16. The apparatus of claim 13, wherein the field of view provided for display is greater than 30 degrees.

17. The apparatus of claim 13, wherein the apparatus is a holographic waveguide display.

18. An apparatus for providing light from a light source to an eye location, comprising:
   a substrate having a first glass layer and a second glass layer;
   a first set of fold gratings in a first region of a substrate, disposed between the first glass layer and the second glass layer, arranged to receive light from the light source and to diffract the received light in a first direction as first diffracted light;
   a second set of output gratings in a second region of the substrate, disposed between the first glass layer and the second glass layer, arranged to receive the first diffracted light and to diffract the first diffracted light to the eye location in a second direction as second diffracted light, wherein the first direction is orthogonal to the second direction; and
   a third region, without gratings, of the substrate, disposed between the first glass layer and the second glass layer, arranged between the first and second regions, and arranged to propagate the first diffracted light to the second set of output gratings,
   wherein the first set of fold gratings, the second set of output grating, the first glass layer, the second glass layer and the third region are part of a same waveguide structure.

* * * * *